US007761853B2

(12) United States Patent
Hirata et al.

(10) Patent No.: US 7,761,853 B2
(45) Date of Patent: Jul. 20, 2010

(54) PORTABLE TERMINAL DEVICE, METHOD FOR RESTORING PROGRAM, METHOD FOR TERMINATING PROGRAM, AND COMPUTER PROGRAM THEREFOR

(75) Inventors: Akira Hirata, Yokohama (JP); Hirotsugu Iwata, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1184 days.

(21) Appl. No.: 11/362,417

(22) Filed: Feb. 23, 2006

(65) Prior Publication Data
US 2006/0195504 A1    Aug. 31, 2006

(30) Foreign Application Priority Data
Feb. 25, 2005   (JP)   .......................... P2005-051332
Feb. 25, 2005   (JP)   .......................... P2005-051333

(51) Int. Cl.
*G06F 9/44* (2006.01)
(52) U.S. Cl. ...................................... 717/127; 718/100
(58) Field of Classification Search ................ 717/124, 717/126–127, 131; 718/101–102, 107, 100
See application file for complete search history.

(56) References Cited

U.S. PATENT DOCUMENTS

| 5,134,712 | A  | * | 7/1992 | Yamamoto | 714/13 |
|---|---|---|---|---|---|
| 5,701,463 | A  | * | 12/1997 | Malcolm | 707/10 |
| 6,845,408 | B1 | * | 1/2005 | Lemke et al. | 710/18 |
| 7,376,442 | B2 | * | 5/2008 | Yoshioka | 455/556.2 |
| 2002/0003535 | A1 | * | 1/2002 | Cho | 345/204 |
| 2003/0110202 | A1 | * | 6/2003 | Shitahaku | 709/102 |
| 2004/0023646 | A1 | * | 2/2004 | Inami et al. | 455/418 |
| 2004/0151296 | A1 | * | 8/2004 | Gamble | 379/218.01 |
| 2004/0172526 | A1 | * | 9/2004 | Tann et al. | 713/2 |
| 2004/0188529 | A1 | * | 9/2004 | Kim | 235/472.01 |
| 2005/0003850 | A1 | * | 1/2005 | Tsuda et al. | 455/550.1 |

(Continued)

FOREIGN PATENT DOCUMENTS

JP    06-044084    2/1994

(Continued)

OTHER PUBLICATIONS

Japanese language office action and its English language translation for corresponding Japanese application 2005051332.

*Primary Examiner*—Wei Y Zhen
*Assistant Examiner*—Hiren Patel
(74) *Attorney, Agent, or Firm*—Hogan Lovells US LLP

(57) ABSTRACT

A portable terminal device that controls execution, pausing, and termination of programs, including: a program execution section that makes an executing program become suspended, which is pausing if the executing program is an unmanaged program, or is terminating and storing restore information for restoration into a storage section if the executing program is a managed program and a program management section that makes the program execution section terminate the executing program upon receiving a request to terminate the executing program, wherein if there are the executing program and a suspended program that is being suspended by the program execution section and has an unmanaged program when the program execution section terminates the executing program, the program management section terminates the unmanaged program and reads restore information corresponding to a predetermined managed program that has been preset and makes the program execution section execute the predetermined managed program.

5 Claims, 21 Drawing Sheets

U.S. PATENT DOCUMENTS

| | | |
|---|---|---|
| 2005/0021876 A1* | 1/2005 | Asai et al. .................... 710/1 |
| 2006/0095916 A1 | 5/2006 | Nishida |
| 2006/0229106 A1* | 10/2006 | Otaka et al. ................ 455/566 |

FOREIGN PATENT DOCUMENTS

| | | |
|---|---|---|
| JP | 2002175191 A | 6/2002 |
| JP | 2003256219 A | 9/2003 |
| JP | 2003-319020 | 11/2003 |
| JP | 2006127208 A | 5/2006 |
| JP | 2006185003 A | 7/2006 |

* cited by examiner

PORTABLE TERMINAL DEVICE, METHOD FOR RESTORING PROGRAM, METHOD FOR TERMINATING PROGRAM, AND COMPUTER PROGRAM THEREFOR

BACKGROUND OF THE INVENTION

1. Field of the Invention

The present invention relates to a portable terminal device, a method for restoring a program for controlling execution of a plurality of programs, a method for terminating a program, and a computer program therefor.

Priority is claimed on Japanese Patent Application Nos. 2005-51332 and 2005-51333, filed Feb. 25, 2005, the contents of which are incorporated herein by reference.

2. Description of Related Art

With conventional techniques, in order to achieve multi-task-like operations in which a plurality of application programs are started simultaneously in a single-task operating system (OS), a thread history of application programs being executed on a memory area of the OS is stored. The operating system monitors whether or not any application program requests an operation by means of a timer or the like. If there is an application program requesting an operation, an entry of that application program is added to the thread history of application programs and the operating system switches the control to the application program. When an operation is switched back to the application program that had been used, entries are read from the accumulated thread history starting from the one that was accumulated the earliest and the operation is switched in a one-by-one manner for the application of each read entry (see, for example, Japanese Unexamined Patent Application, First Publication No. H06-044084).

Japanese Unexamined Patent Application, First Publication No. H06-044084 discloses an example of such a technique for personal computers that have higher capacities of management than portable telephone terminals and less occurrences of sudden interruptions, such as incoming calls.

In conventional techniques for portable telephone terminals, when a startup of a plurality of application programs is instructed by means of a timer or the like, an operation of the next application program cannot start until switching and completing applications one-by-one. Furthermore, it is not possible to retain multiple statuses of the previous application programs. As a result, in the portable device of the conventional technique disclosed in Japanese Unexamined Patent Application, First Publication No. 2003-319020, application programs are monitored and controlled individually according to type or status upon an occurrence of events, such as an incoming call and the like.

In a typical portable telephone terminal, as shown in FIG. 1, when the terminal is turned on, a standby screen application program (hereinafter, an application program is referred to as an applet) for displaying a standby screen is started first. Afterward, in response to operations made by a user, applets for handling calls or electronic mails installed in the terminal as default by the developer of the portable telephone terminal hereinafter, such applets are referred to as "static applets") and download applets that the user obtained on the Internet using the portable telephone terminal, such as games, are started sequentially. In such a case, in functional blocks for application management or the like installed in the portable telephone terminal, programs that are started are stacked in the memory in the order of startup for achieving the above-described multitask-like operations, as shown in FIG. 1. In this case, programs that are started earlier are suspended, and can restart in the reverse order of sticking order after programs that are started later are terminated.

It should be noted that the reason such a system is required in portable telephone terminals is as follows. In conventional systems other than portable telephone terminals, the operation of download applets, such as game programs, has no problem when a terminating of a trial version game program occurs. Because such terminals have not only a CPU to manage the OS but also another CPU and the like to manage operations of programs. However, in portable telephone terminals in which memory spaces are limited, it is required that a variety of application programs be managed in a single OS.

Oftentimes, download applets, such as the above game programs, are generally constructed to be able to terminate forcibly by depressing a predetermined key of a portable telephone terminal. In such a case, portable telephone terminals cannot maintain items of information of the order of startup of the applets, as in the example shown in FIG. 1.

For example, assuming a case in which a download applet A stars a static applet B after startup of the download applet A, and that static applet B starts a download applet B is stared, as shown in FIG. 1. In a more concrete example, it is assumed that the static applet B is a web browser program and the download applet B is a trial version game program that has part of the functions of a full product version and that has been obtained from a web page with the web browser by a user by means of operation of the portable telephone. Oftentimes, for the static applet B, parameters may be set for communicating with the download applet A from which the static applet B is started, or a callback function to the download applet A may be set in such a case.

However, if the download applet B that was started the last is forcibly terminated, the OS installed in the portable telephone terminal generally clears the information related to the download applet B from the memory retaining this data, as well as deleting other downloaded applets that have been suspended and the data thereof is stored in the memory from the viewpoint of conservation of the memory space. In other words, in the example shown in FIG. 1, the download applet A is terminated in response to the forced termination of the download applet B.

The termination of the download applet A may cause the following problems. More specifically, for the static applet B, parameters may be set for communicating with the download applet A from which the static applet B is started, or a callback function to the download applet A may be set, as described previously. For this reason, when the static applet is restored, an access to the download applet A that has been deleted from the memory may occur when an attempt is made to restore the static applet B. So this access may be reset as an abnormal operation by the OS that detects the access and treats it as an unauthorized access In order to avoid this problem, the application management block may employ a structure in which, when the download applet A, i.e., an applet different from the download applet B, is terminated by the OS, the static applets A and B are also terminated and the standby screen applet is started after the termination of the download applet B, thereby preventing reset by the OS.

However, the above operation in which just a forced termination of a download program causes termination of all of the suspended download applets and static applets and the standby screen is started is not user-friendly since the users consider expects that applets are restored in the reverse order to the order of startup.

SUMMARY OF THE INVENTION

The present invention was conceived in order to solve the above-mentioned problems, and one object thereof is to provide a portable terminal device and a method for restoring a program for controlling execution of a plurality of programs that enable restoration of, when a program in an executing status is forcibly terminated, certain programs that have been predetermined among the programs in a suspended status, and a computer program therefor.

Furthermore, another object of the present invention is to provide a portable terminal device and a method for terminating a program that enable retention of the restoring order of programs in a suspended status, when a program in an executing status is forcibly terminated, by not terminating the program in the suspended status and individually terminating programs in the executing status, and a computer program therefor.

To solve the problems described above, the present invention is directed to a portable terminal device that controls execution, pausing, and termination of programs, including: a program execution section that makes an executing program become suspended, which is pausing if the executing program is an unmanaged program, or is terminating and storing restore information for restoration into a storage section if the executing program is a managed program and a program management section that makes the program execution section terminate the executing program upon receiving a request to terminate the executing program, wherein if there are the executing program and a suspended program that is being suspended by the program execution section and has an unmanaged program when the program execution section terminates the executing program, the program management section terminates the unmanaged program and reads restore information corresponding to a predetermined managed program that has been preset and makes the program execution section execute the predetermined managed program.

In the above portable terminal device, if there are a plurality of suspended programs including the predetermined managed program upon termination of the executing program by the program execution section, the program management section may terminate all of the suspended programs except the predetermined managed program, and reads the restore information corresponding to the predetermined managed program, and makes the program execution section restore the predetermined managed program.

In the above portable terminal device, the managed program may include a standby screen program that is executed upon startup or standby, and if the suspended program does not have the predetermined managed program upon terminating the executing program, the program management section may terminate all of the suspended programs and makes the program execution section execute the standby screen program.

The above portable terminal device may further include an output section that outputs at least one of image data, moving image data, and audio data; and a communication section that connects to a communication network, and the predetermined managed program may be a browsing program that outputs information received by the communication section in the communication network to the output section.

In the above portable terminal device, the program management section, while the browsing program is being executed, may be able to make the program execution section execute the unmanaged program based on the received information.

Furthermore, the present invention provides a method for restoring a program in a portable terminal device having a program execution section that controls the program's execution, pausing, and termination of programs, a program management section that manages a program controlled by the program execution section, and a storage section, including: suspending, which is pausing an executing program that is being executed if the executing program is an unmanaged program, or is terminating if the program is a managed program, and making restore information for restoring to executing program to be stored in the storage section terminating, which is making the executing program terminate upon receiving a request to terminate the executing program; and if there are the executing program and a suspended program that is being suspended by the program execution section and has an unmanaged program upon terminating of the executing program, reading restore information corresponding to a predetermined managed program that has been preset, and making the program execution section restore the predetermined managed program.

Furthermore, the present invention provides a computer program that makes a computer of a portable terminal device having a program execution section that controls the program's execution, pausing, and termination of programs, a program management section manages a program controlled by the program execution section, and a storage section, execute the steps of: suspending, which is pausing an executing program that is being executed if the executing program is an unmanaged program, or is terminating if the program is a managed program, and making restore information for restoring the executing program to be stored in the storage section; terminating, which is making the executing program terminate upon receiving a request to terminate the executing program; and if there are the executing program and a suspended program that is being suspended by the program execution section and has an unmanaged program upon terminating of the executing program, reading restore information corresponding to a predetermined managed program that has been preset, and making the program execution section restore the predetermined managed program.

Furthermore, the present invention provides a portable terminal device that controls execution, pausing, and termination of programs, including: a program execution section that controls execution, suspension, and termination of programs; an output section that outputs information based on an instruction of the program; and a program management section that makes the program execution section suspend the first program when a second program is being executed, wherein when the program management section receives a termination request of the first program that is suspended based on execution of the second program from the second program, the program management section terminates the second program and executes the first program, and then terminates the first program, and the program management section sends a pause request to the output section at the termination of the second program and execution of the first program.

In the above portable terminal device, the program management section may send a restart request to the output section after making the program execution section terminate the first program.

In the above portable terminal device, the program management section, when there is a third program that has been executed before the first program is executed and is being suspended, may make the program execution section restore the third program when the program management section makes the program execution section terminate the first program.

In the above portable terminal device, the second program may be a termination confirmation program in response to a detection of an operation of a predetermined key while the first program is being executed.

In the above portable terminal device, the programs may have at least unmanaged program and a managed program, wherein a program execution section that makes an executing program that is executed become suspended, which is pausing if the executing program is the unmanaged program, or is terminating and storing restore information for restoration by the program execution section if the executing program may be the managed program; and wherein the first program is the managed program.

In the above portable terminal device, the programs may have at least unmanaged program and a managed program, wherein a program execution section that makes an executing program that is executed become suspended, which is pausing if the executing program is the unmanaged program, or is terminating and storing restore information for restoration by the program execution section if the executing program may be the managed program; wherein the third program is the managed program; and wherein the program management section, stores restore information of the third program for restoration when the third program is terminated based on execution of the first program, and reads restore information of the third program to make the program execution section restore the third program when the program management section makes the program execution section terminate the first program.

Furthermore, the present invention provides a method for terminating a program in a portable terminal device having a program execution section that controls the program's execution, suspension, and termination of programs, a program management section that manages the program controlled by the program execution section, and an output section that outputs information based on an instruction of the program, including: suspending a first program upon executing a second program by the program execution section; receiving by the program management section a termination request for the first program from the second program; sending by the program management section a pause request to the output section upon receiving the termination request; making by the program management section the program execution section terminate the second program upon receiving the termination request; making by the program management section the program execution section restore the first program upon termination of the second program; and terminating the first program after restoration of the first program.

Furthermore, the present invention provides a computer program that makes a computer of a portable terminal device having a program execution section that controls the program's execution, suspension, and termination of programs, a program management section that manages the program controlled by the program execution section, and an output section that outputs information based on an instruction of the program, execute the steps of: suspending a first program upon executing a second program by the program execution section; receiving by the program management section a termination request for the first program from the second program; sending by the program management section a pause request to the output section upon receiving the section request; making by the program management section the program execution section terminate the second program upon receiving the termination request; making by the program management section the program execution section restore the first program upon termination of the second program; and terminating the first program after restoration of the first program.

According to the present invention, it is possible to obtain a portable terminal device that enables to restoration of, when there are programs in a suspended status and a program in an executing status is forcibly terminated, certain programs that have been predetermined among the programs in the suspended status.

Furthermore, according to the present invention, it is possible to obtain a portable terminal device that enables the retention of the restoring order of programs in a suspended status, when a program in an executing status is forcibly terminated, by not terminating the program in the suspended status and individually terminating programs in the executing status.

DETAILED DESCRIPTION OF THE INVENTION

First Aspect

In the following, a portable telephone terminal according to an embodiment of a first aspect of the present invention will be explained with reference to the drawings.

Figure 1:
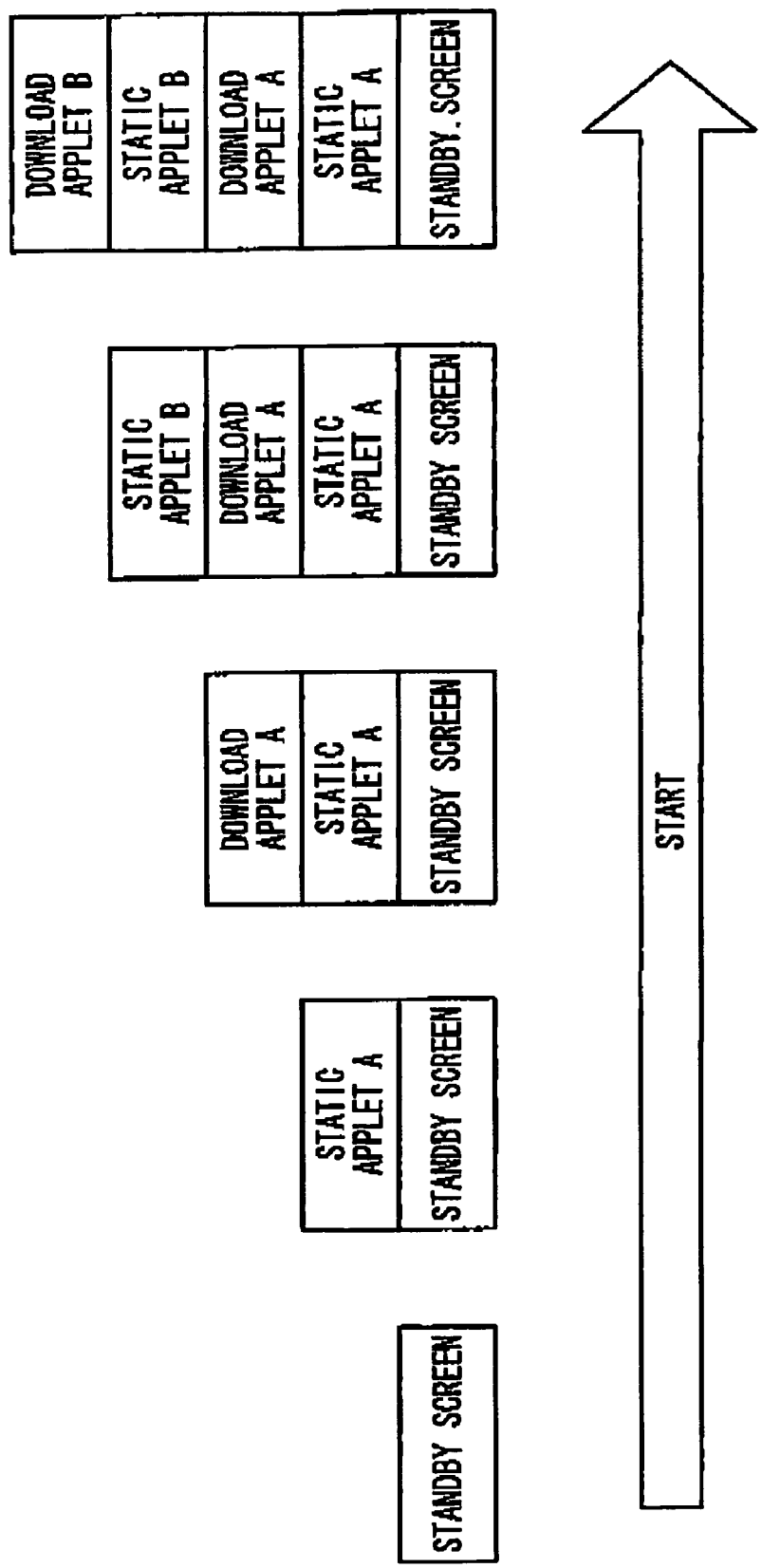
FIG. 1 is a diagram illustrating how applets are started and restored in a conventional technique (part 1).
Figure 2:
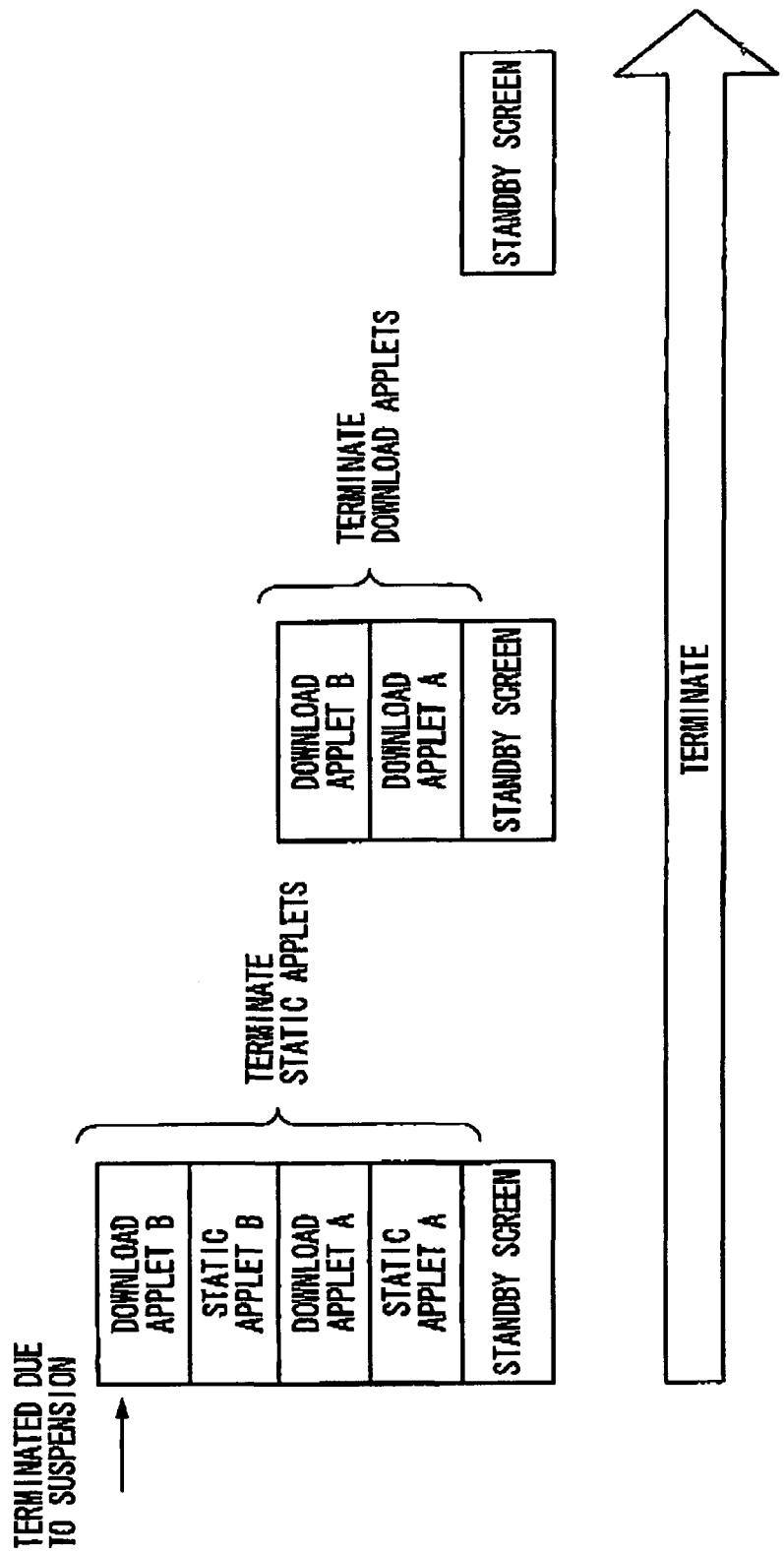
FIG. 2 is a diagram illustrating how applets are started and restored in a conventional technique (part 2).
Figure 3:
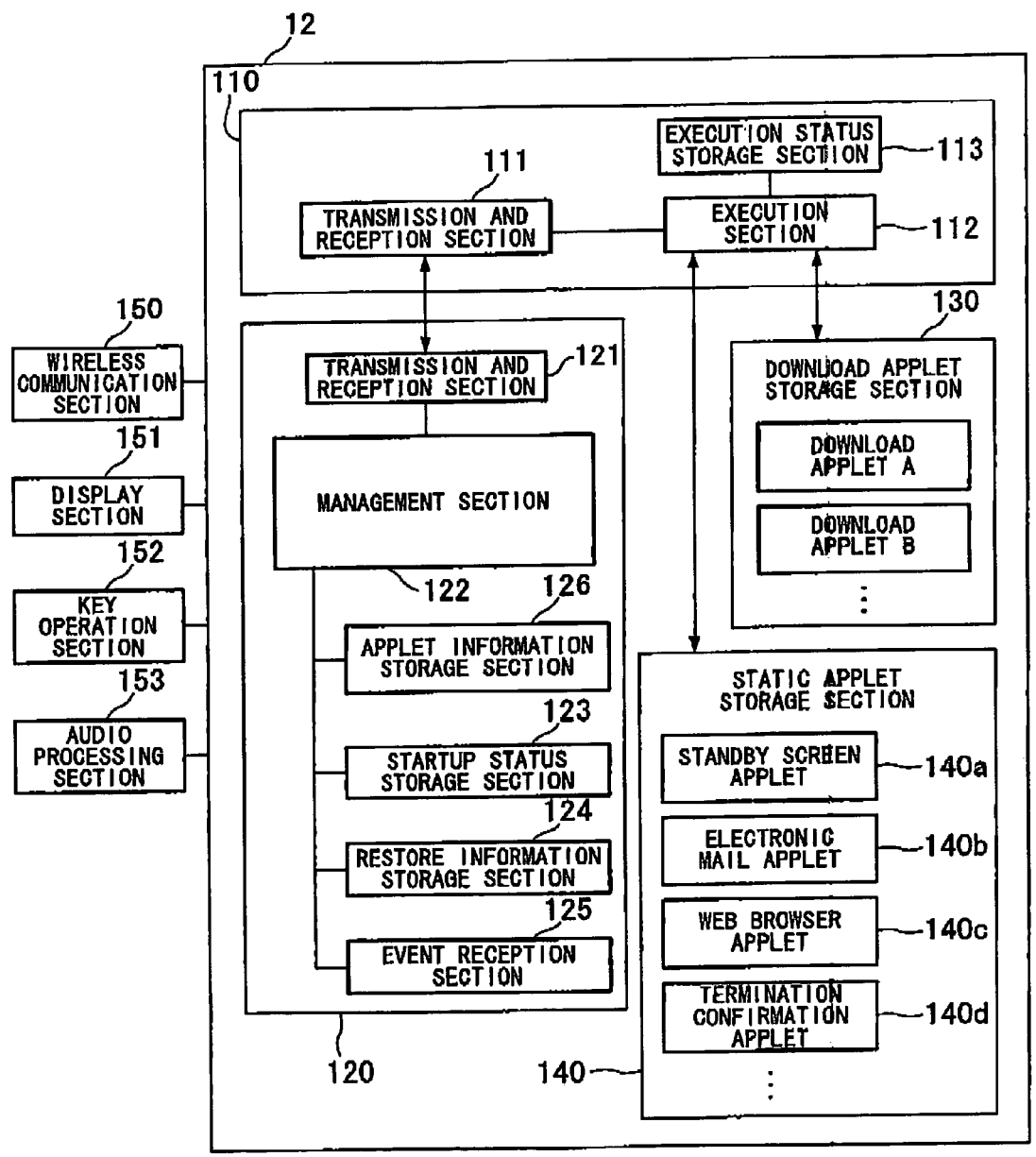
FIG. 3 is a block diagram illustrating an internal structure of a portable telephone according to an embodiment according to a first aspect of the present invention.

FIG. 3 is a schematic block diagram illustrating a portable telephone terminal 11 according to this embodiment.

In FIG. 3, the portable telephone terminal 11 includes, as basic functions of a portable telephone, a wireless communication section 150 that connects to a public communication network via a wireless communication, a display section 151 having a liquid crystal display, a key operation section 152 that receives inputs from a user, and an audio processing section 153 that inputs and outputs the voice of the user upon placing or receiving a call and outputs data of a call incoming melody upon receiving an incoming call. The portable telephone terminal 11 also includes a control section 12 that controls startup, pausing, and termination of applets.

The control section 12 includes an operating system 110 (hereinafter, referred to as an "OS") that executes a program software (hereinafter, referred to as an "applet"), an application manager 120 (hereinafter, referred to as "APMAN") that controls startup of an applet by determining the conflict status of that applet and the like, a static applet storage section 140 that stores static applets installed by default in the portable telephone terminal, and a download applet storage section 130 that stores download applets not installed by default in the portable telephone terminal.

In the control section 12, the static applet storage section 140 stores static applets that have been installed in the terminal by default by the developer of the portable telephone terminal 11. Such static applets may include, for example, a standby screen applet 140a that displays a standby screen on the display section 151, an electronic mail applet 140b that sends and receives electronic mails via the wireless communication section 150, and a web browser applet 140c that connects to the Internet via the wireless communication section 150 and displays web pages on the display section 151. Furthermore, other static applets may include a termination confirmation applet 140d. When an applet being executed is being suspended or forcibly terminated by an operation by the user using the key operation section 152, the termination confirmation applet 140d displays a screen asking for confirmation by the user, and suspends or forcibly terminates the applet being executed according to an operation made by the user using the key operation section 152.

The download applet storage section 130 stores applets of game programs that are downloaded from the Internet via the public communication network using the wireless communication section 150 in response to an operation made by the user using the key operation section 152 or applets, such as game programs, that are read to the portable telephone terminal from a detachable recording medium by a predetermined operation.

The OS 110 controls execution, pausing, and termination of the static applets and the download applets. In the OS 110, a transmission and reception section 111 is connected to the APMAN 120, and sends and receives various pieces of information to and from the APMAN 120, such requests asking for startup of an applet or an acknowledgement from an applet that has been started. An executing status storage section 113 stores data of applets executed or paused by the execution section 112. The execution section 112 reads a static applet from the static applet storage section 140 or a download applet from the download applet storage section 130 in response to a request received from the APMAN 120 via the transmission and reception section 111, records data of the applet that has been read into the executing status storage section 113, and executes it.

The APMAN 120 starts, halts, or terminates static applets installed by default, or determines if there is a conflict between static applets. In the APMAN 120, a transmission and reception section 121 is connected to the transmission and reception section 111 of the OS 110, and sends and receives various pieces of information to and from the transmission and reception section 111, such as requests asking for startup of an applet or an acknowledgement from an applet that has been started. When a static applet is going to be started, a management section 122 determines a conflict status of the static applet, and sends a startup request for the static applet to the execution section 112 of the OS 110 via the transmission and reception section 121 if it is determined that the static applet can be started. Furthermore, the management section 122 receives an input made by the user using the key operation section 152, and sends a startup request of the download applet to the execution section 112 of the OS 110 when the download applet is going to be started.

A started status storage section 123 stores information related to an applet that is executed or paused by the execution section 112 of the OS 110. If there is any static applet that is terminated in the OS 110 but halted in the APMAN 120 by the management section 122 for the purpose of realizing a multitask-like operation on the static applet, a restore information storage section 124 stores information for restoring that static applet.

An event reception section 125 receives events that occur in response to an instruction input based on an operation made by the user using the key operation section 152 to start or stop an applet in order to start or stop an applet or events sent by an applet when that applet starts another applet.

An applet information storage section 126 sets an identification of a static applet to be restored among static applets in the temporarily terminated status in a case where an applet being executed is forcibly terminated, as described later.

It should be noted that the above-described program execution section corresponds to the execution section 112 and the program management section corresponds to the management section 122.

Furthermore, a download applet corresponds to the above-described unmanaged program, and a static applet corresponds to the above-described managed program.

Furthermore, the static applet corresponding to the identification stored in the applet information storage section 126 corresponds to the above-described predetermined program.

Furthermore, in this embodiment, statuses related to a process of an applet are defined as follows. First, the status in which an applet is terminated in the OS 110 but halted in the APMAN 120 is defined as a "temporarily terminated" status.

Next, the "terminated" is defined as follows. When the term "normally terminated" is used, the applet is not forcibly terminated by the termination confirmation applet 140d, but is terminated by an internal operation of the applet. On the other hand, when the term "forcibly terminated" is used, it means that the applet is terminated by the termination confirmation applet 140d, that it is not terminated by the internal operation of the applet, and that it is forcibly deleted from the executing status storage section 113.

Next, the term "suspend" refers to a "paused status" in which the status stored in the executing status storage section 113 is maintained for download applets, whereas the term refers to the above-described "temporarily terminated status" for static applets.

Figure 4:
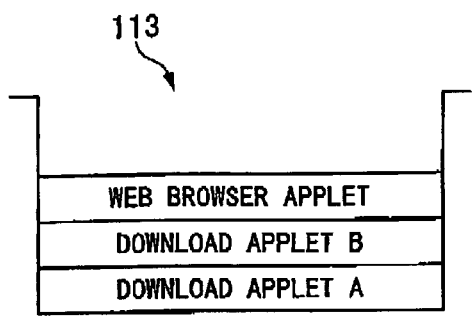
FIG. 4 is a diagram illustrating a data structure of an executing status storage section in the embodiment.

FIG. 4 is a diagram illustrating a data structure of the executing status storage section 113. The executing status storage section 113 is a stack-type storage area that is allocated in a heap area for storing data of an applet when the applet is being executed. Since the executing status storage section 113 is a stack-type storage area, the applet that was started the earliest is stored at the bottom of stack. When a new applet is started, the previously started applet is paused and the new applet is stacked on the paused applet. In other words, the applet data that is stored at the top is the applet that is currently being executed. Furthermore, when the top applet is terminated by the execution section 112, the data of the terminated applet on the top terminate is deleted. The second top applet data corresponding to the paused applet is released by the execution section 112, and the applet corresponding to that applet data is restarted.

Figure 5:
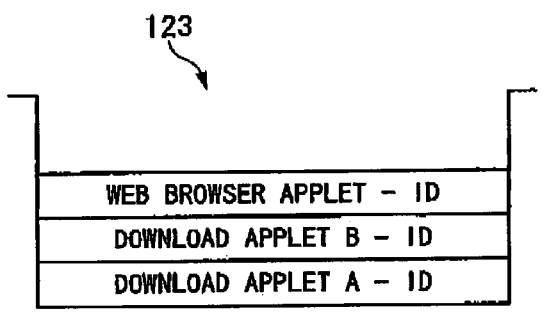
FIG. 5 is a diagram illustrating a data structure of a started status storage section in the embodiment.

FIG. 5 is a diagram illustrating a data structure of the started status storage section 123. The started status storage section 123 is also a stack-type storage area, and stores information relating to an applet being executed by the execution section 112, for example, it stores identification information (hereinafter, referred to as an "ID") given to each applet. In other words, IDs of applets corresponding to applet data stored in the executing status storage section 113 are stored in accordance with the order thereof in the executing status storage section 113. The management section 122 of the APMAN 120 can obtain information on an applet that is currently executed or paused in the executing status storage section 113 of the OS 110 by referring to the started status storage section 123

Figure 6:
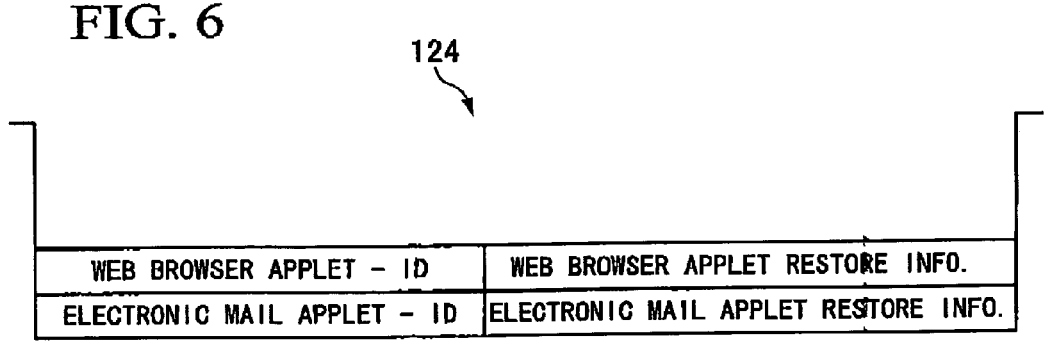
FIG. 6 is a diagram illustrating a data structure of a restore information storage section in the embodiment.

FIG. 6 is a diagram illustrating a data structure of the restore information storage section 124. The restore information storage section 124 is also a stack-type storage area. The APMAN 120 executes a startup control in which only one static applet is executed in the OS 110 at any time so that a plurality of static applets can be simultaneously started while saving the free memory pace of the executing status storage section 113. In this case, restore information for restoring a static applet in the above-described temporarily terminated status which is terminated in the OS 110 but halted in the APMAN 120 is related to an ID that has been given to the static applet and is recorded in the restore information storage section 124.

Next, an operation executed by the OS 110 and the APMAN 120 to start an applet will be explained with reference to FIGS. 7 to 10. The following scenario will be explained. After startup of the standby screen applet 140a when the portable telephone terminal 11 is turned on, the electronic mail applet 140b and a download applet A are started in this order in response to the user's operations of the key operation section 152. The web browser applet 140c is started from the download applet A, and the web browser applet 140c in turn starts a download applet B.

Figure 7:
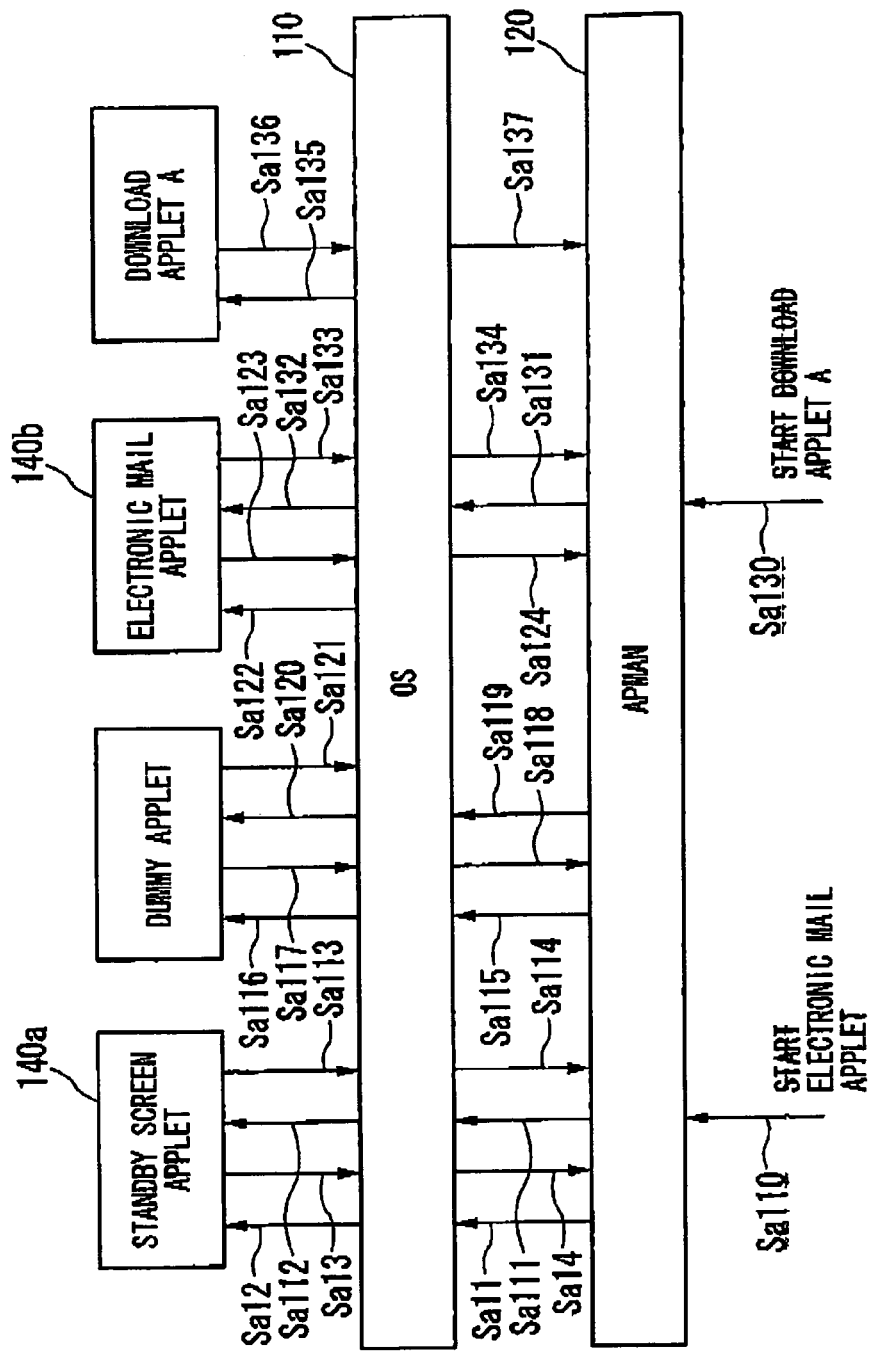
FIG. 7 is a sequence chart illustrating how start of applets is handled in the embodiment (part 1).
Figure 8:
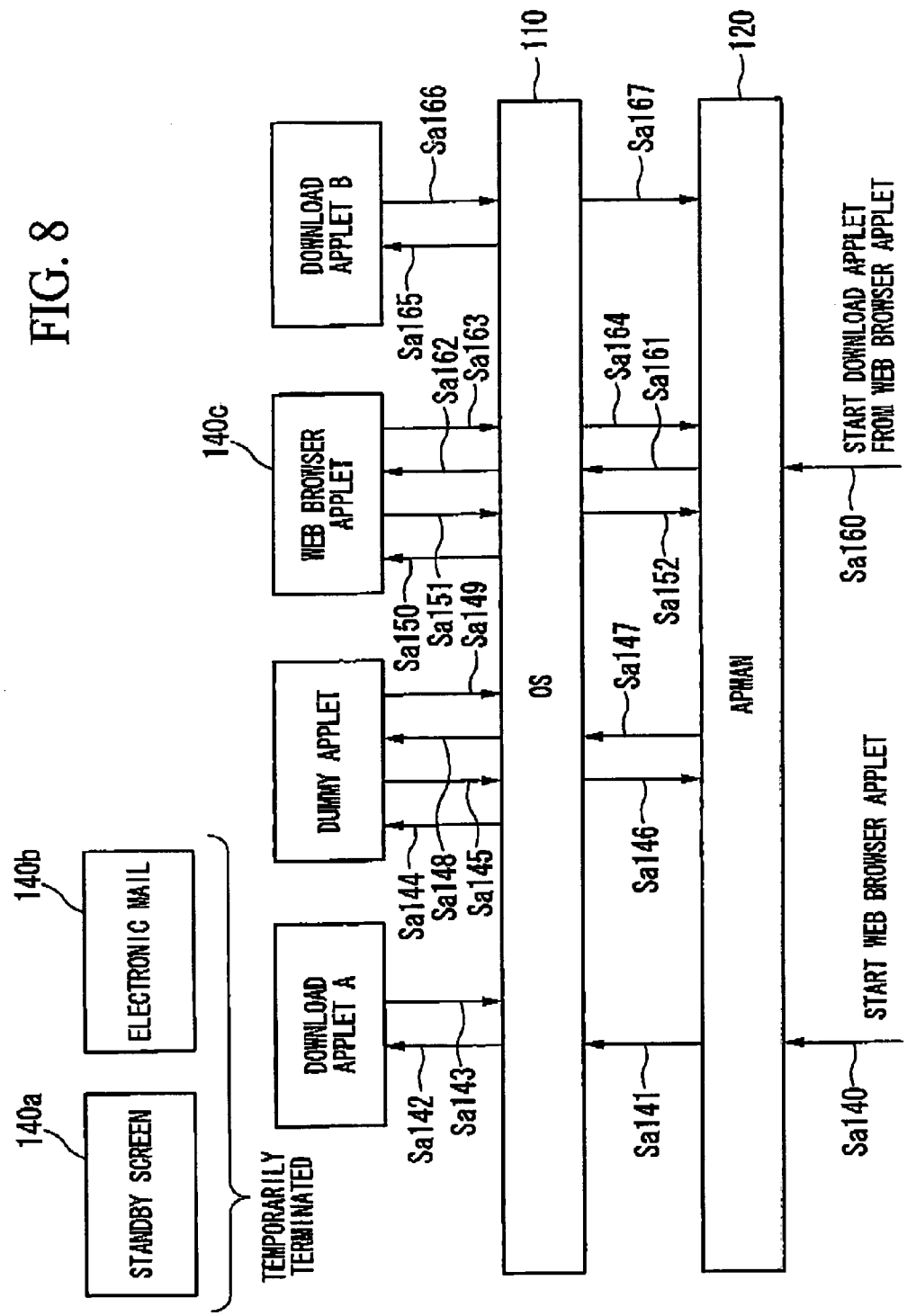
FIG. 8 is a sequence chart illustrating how start of applets is handled in the embodiment (part 2).
Figure 9:
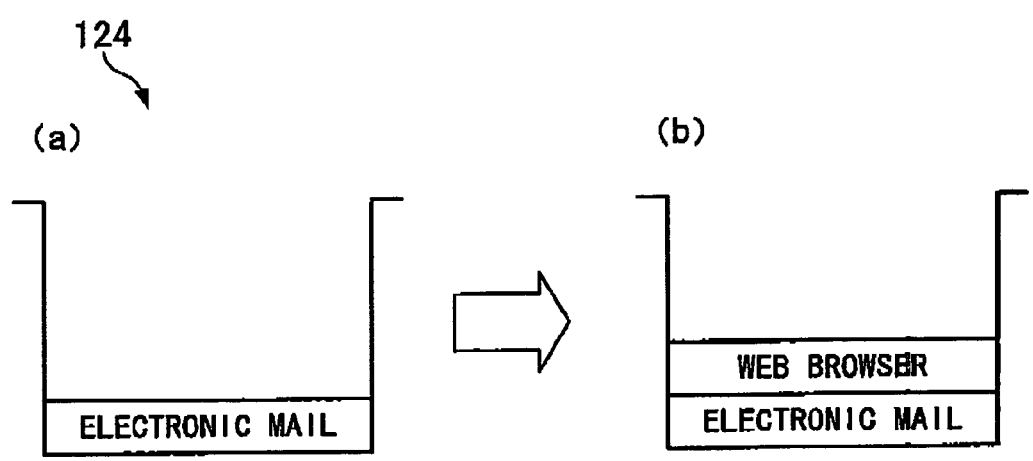
FIG. 9 is a diagram illustrating information stored in the restore information storage section for handling startup of applets in the embodiment.
Figure 10:
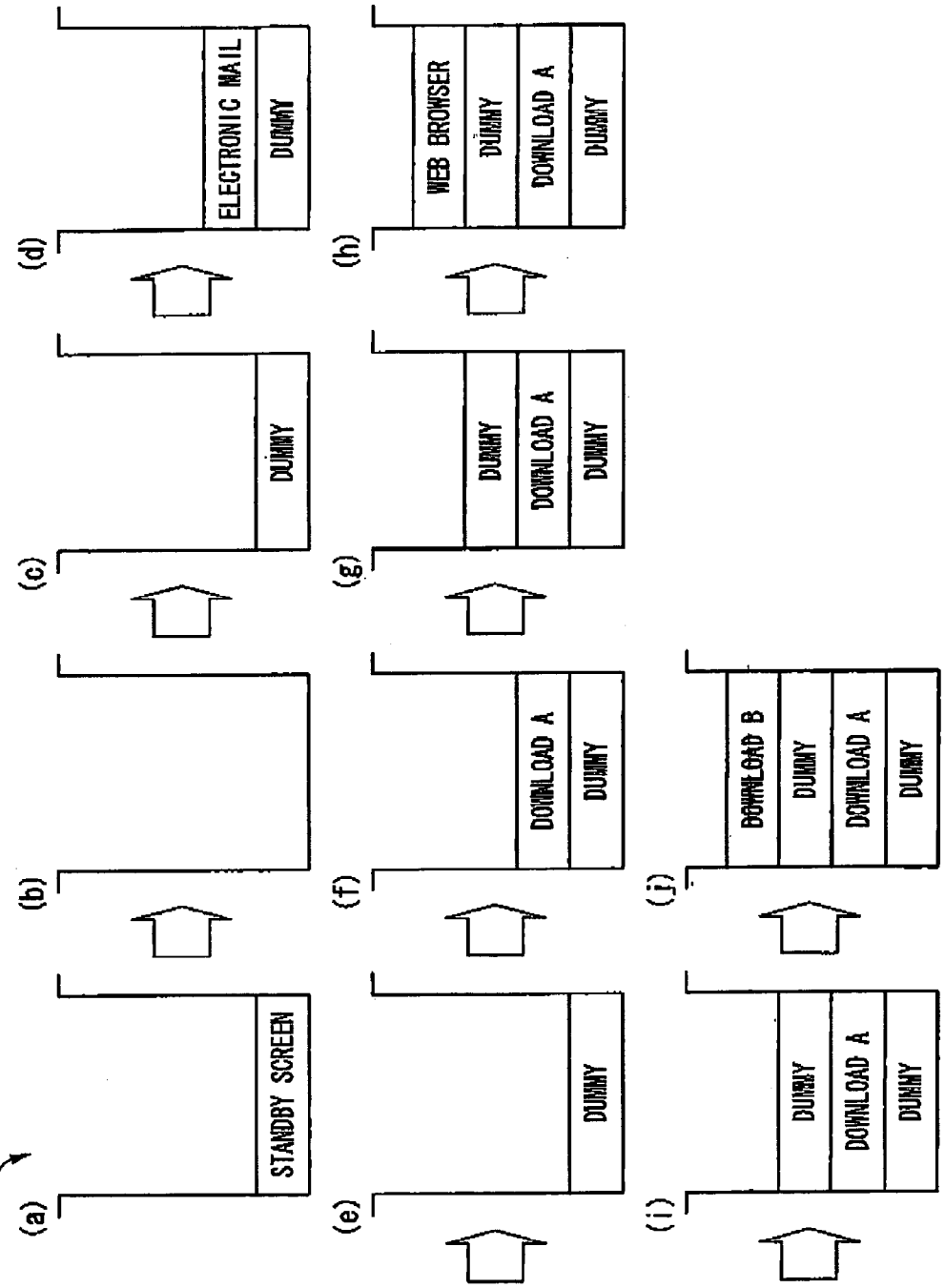
FIG. 10 is a diagram illustrating information stored in the executing status storage section for handling startup of applets in the embodiment.

FIG. 7 is a sequence chart illustrating the operation in which the standby screen applet 140a, the electronic mail applet 140b, and the download applet A are started. Furthermore, FIG. 8 is a sequence chart illustrating the operation in which the web browser applet 140c and the download applet B are started following the operation shown in FIG. 7. Furthermore, FIG. 9 is a diagram illustrating how information stored in the restore information storage section 124 is modified in the operations shown in FIGS. 7 and 8. Furthermore, FIG. 10 is a diagram illustrating how information stored in the executing status storage section 113 is modified in the operations shown in FIGS. 7 and 8, to FIG. 9.

First, when the portable telephone terminal 11 is turned on in response to an operation made by the user using the key operation section 152, the APMAN 120 is started and the management section 122 of the APMAN 120 then autonomously sends a standby screen applet startup request to the execution section 112 of the OS 110 (step Sa11).

Once receiving the standby screen applet startup request, the execution section 112 reads the standby screen applet 140a from the static applet storage section 140, records it into the executing status storage section 113, and executes the standby screen applet 140a (step Sa12). At this stage, the executing status storage section 113 is in the status shown in the area (a) of FIG. 10. Once started, the standby screen applet 140a sends a startup acknowledgement to the execution section 112 (step Sa13). The execution section 112 sends startup information of the standby screen applet 140a to the management section 122. Once receiving the startup information of the standby screen applet 140a, the management section 122 records an ID of the standby screen applet 140a into the started status storage section 123 (step Sa14).

Next, in order to start the electronic mail applet 140b, the user inputs a startup instruction for the electronic mail applet 140b by operating the key operation section 152. A startup event occurs in response to the input startup instruction and is received by the event reception section 125 of the APMAN 120. The event reception section 125 sends the received event to the management section 122 (step Sa110). The management section 122 receives that startup event from event reception section 125 and reads an ID of the applet currently being executed from the started status storage section 123. Since the ID of the read applet is that of the standby screen applet 140a that is managed by the APMAN 120, the management section 122 sends a temporal termination request to the execution section 112 of the OS 110 in order to put the standby screen applet 140a to the temporarily terminated status (step Sa111).

The execution section 112 receives the temporal termination request and sends a termination instruction including temporal termination information to the standby screen applet 140a so that the standby screen applet 140a is terminated in the OS 110 while being in the halted status in the APMAN 120 (step Sa112). The standby screen applet 140a receives the termination instruction including temporal termination information, and sends a termination acknowledgement to the execution section 112. It is deleted from the executing status storage section 113 by the execution section 112 (step Sa113).

At this stage, the executing status storage section 113 is in the status shown in the area (b) of FIG. 10.

It should be noted that since the standby screen applet 140a does not require restore information for being restored, no restore information is stored in the restore information storage section 124 upon a temporal termination. When the standby screen applet 140a is restored, it is started in the manner similar to the startup from an initial status.

Upon receiving the termination acknowledgement, the execution section 112 sends information of the termination acknowledgement to the management section 122. Once the management section 122 receives the information of the termination acknowledgement, it deletes an ID of the standby screen applet 140b from the started status storage section 123 (step Sa114). Next, the management section 122 receives the termination acknowledgement of the standby screen applet 140b and sends a dummy applet startup instruction to the execution section 112 in order to start a dummy applet (step Sa115).

As used herein, a dummy applet refers to an applet that displays nothing on the screen nor outputs any sounds. There are the following two reasons (1) and (2) to start the dummy applet.

(1) If there are a temporarily terminated static applet and a download applet that was started after the startup of that static applet and is currently paused, since that static applet is deleted from the executing status storage section 113, the download applet is restored earlier in the executing status storage section 113 when the applet that is currently being executed is terminated. Thus, by starting the dummy applet prior to the startup of the download applet, it becomes possible to maintain the restoring order because the dummy applet is started before the download applet and the static applet is restored in response to the restoration of the dummy applet.

(2) The standby screen applet 140a that is started upon the startup is to be restored by restarting it when the standby screen applet 140a is temporarily terminated by the APMAN 120 since there is no restore information to restore it from the temporarily terminated status. However, in that case, there is no restore information for restoration in the restore information storage section 124 and accordingly there is no cue to restart the standby screen applet 140a. Thus, restart of the standby screen applet 140a is enabled by starting the dummy applet before temporarily terminating the standby screen applet 140a.

Next, the execution section 112 that receives the dummy applet startup instruction in FIG. 7 records the data of the dummy applet into the executing status storage section 113 in order to start the dummy applet (step Sa116). A this stage, the executing status storage section 113 is in the status shown in the area (c) of FIG. 10.

The started dummy applet sends a startup acknowledgement to the execution section 112 (step Sa117). Once receiving the startup acknowledgement from the dummy applet, the execution section 112 sends startup information of the dummy applet to the management section 122. The management section 122 receives the startup information of the dummy applet and records an ID of the dummy applet into the started status storage section 123 (step Sa118). Next, the management section 122 that receives the startup information of the dummy applet sends a startup request for the electronic mail applet 140b to the execution section 112 in order to start the electronic mail applet 140b (step Sa119). Once receiving the startup request, the execution section 112 sends a pause instruction to the dummy applet in order to put the dummy applet in the paused status (step Sa120).

The dummy applet receives the pause instruction and is put in the paused status, and sends a pause acknowledgement to the execution section 112. The data of the dummy applet is not deleted from the executing status storage section 113 in response to the pausing, and the stored status is retained (step Sa121). Next, the execution section 112 that receives the pause acknowledgement reads the electronic mail applet 140b from the static applet storage section 140 and records the electronic mail applet 140b into the executing status storage section 113 in order to start the electronic mail applet 140b (step Sa122). At this stage, the executing status storage section 113 is in the status shown in the area (d) of FIG. 10. The electronic mail applet 140b sends a startup acknowledgement to the execution section 112 (step Sa123). The execution section 112 that receives the startup acknowledgement of the electronic mail applet 140b sends startup information of the electronic mail applet 140b to the management section 122. The management section 122 receives the startup information of the electronic mail applet 140b and records an ID of the electronic mail applet 140b into the status storage section 123 (step Sa124).

Next, in order to start the download applet A, the user inputs a startup instruction for the download applet A by operating the key operation section 152. A startup event occurs in response to the input startup instruction and is received by the event reception section 125 of the APMAN 120. The event reception section 125 sends the received startup event to the management section 122 (step Sa130). The management section 122 receives that startup event and reads an ID of the applet currently being executed from the started status storage section 123. Since the ID of the read applet is that of the electronic mail applet 140b that is managed by the APMAN 120, He management section 122 sends a temporal termination request to the execution section 112 of the OS 110 in order to put the electronic mail applet 140b in the temporarily terminated status (step Sa131).

The execution section 112 receives the temporal termination request and sends a termination suction including temporal termination information to the electronic mail applet 140b so that the electronic mail applet 140b is terminated in the OS 110 while being in the halted status in the APMAN 120 (step Sa132). The electronic mail applet 140b receives the termination instruction including temporal termination information, and sends a termination acknowledgement to the execution section 112. It is deleted from the executing status storage section 113 by the execution section 112 (step Sa133). At this stage, the executing status storage section 113 is in the status shown in the area (e) of FIG. 10.

The execution section 112 that receives the termination acknowledgement from the electronic mail applet 140b sends restore information of the electronic mail applet 140b to the manage section 122. The management section 122 receives the restore information and records the restore information into the restore information storage section 124. Furthermore, it deletes an ID of the electronic mail applet 140b from the started status storage section 123 (step Sa134). At this stage, the restore information storage section 124 is in the status shown in the area (a) of FIG. 9, and the restore information of the electronic mail applet 140b has been stored.

Furthermore, the execution section 112 that receives the termination acknowledgement from the electronic mail applet 140b reads data of the download applet A from the download applet storage section 130 and records the data of the download applet A into the executing status storage section 113 in order to start the download applet A (step Sa135).

At this stage, the executing status storage section 113 is in the status shown in the area (f) of FIG. 10. The started download applet A sends a startup acknowledgement to the execution section 112 (step Sa136). Once receiving the startup acknowledgement from the download applet A, the execution section 112 sends startup information of the dummy applet to the management section 122. The management section 122 receives the startup information of the download applet A and records an ID of the download applet A into the started storage section 123 (step Sa137). Assuming that the download applet A is an application that searches for information by connecting to the Internet via the wireless communication section 150, a search is carried out in response to an operation of the key operation section 152 made by the user and several URLs (universal resource locators) are displayed on the display section 151 as search results.

FIG. 8 is a sequence chart illustrating operations in which the web browser applet 140c is started from the download applet A and the web browser applet 140c in turn starts the download applet B, following the operations shown in FIG. 7. It should be noted that the standby screen applet 140a and to electronic mail applet 140b are in the temporarily terminated status in FIG. 8.

Once the user selects one of the URLs displayed by the download applet A on the display section 151 by operating the key operation section 152, a startup instruction for the web browser applet 140c is input. A startup event occurs in response to the input startup instruction and is received by the event reception section 125 of the APMAN 120. The event reception section 125 sends the received startup event to the management section 122 (step Sa140). The event reception section 125 receives that event from the management section 122 and reads an ID of the applet currently being executed from the started status storage section 123. Since the ID of the read applet is that of the download applet A that is not managed by the APMAN 120, the management section 122 sends a dummy applet startup instruction to the execution section 112 of the OS 110 in order to start the dummy applet. The dummy applet is started for the above-described reason (1) (step Sa141).

Once receiving the dummy applet startup instruction, the execution section 112 sends a pause instruction to the download applet A that is currently being executed (step Sa142). The download applet A receives the pause instruction and is put in the paused status, and sends a pause acknowledgement to the execution section 112. The data of the download applet A is not deleted from the executing status storage section 113 in response to the pausing, and the stored status is restrained (step Sa143). The execution section 112 that receives the pause acknowledgement records the data of the dummy applet into the executing status storage section 113 in order to start the dummy applet (step Sa144). At this stage, the executing status storage section 113 is in the status shown in the area (g) of FIG. 10. The started dummy applet sends a startup acknowledgement to the execution section 112 (step Sa145). Once receiving the startup acknowledgement from the dummy applet, the execution section 112 sends startup information of the dummy applet to the management section 122. The management section 122 receives the startup information of the dummy applet and records an ID of the dummy applet into the started status storage section 123 (step Sa146).

Next, the management section 122 that receives the startup information of the dummy applet sends a startup request for the web browser applet 140c to the execution section 112 in order to start the web browser applet 140c (step Sa147). Once receiving the startup request, the execution section 112 sends a pause instruction to the dummy applet in order to put the dummy applet in the paused status (step Sa148). The dummy applet receives the pause instruction and is put in the paused status, and sends a pause acknowledgement to the execution section 112. The data of the dummy applet is not deleted from the executing status storage section 113 in response to the pausing, and the stored status is retained (step Sa149). The execution section 112 that receives the pause acknowledgement reads the web browser applet 140c from the static applet storage section 140 and records the web browser applet 140c into the executing status storage section 113 in order to start to web browser applet 140c (step Sa150). At this stage, the executing status storage section 113 is in the status shown in the area (h) of FIG. 10. The web browser applet 140c after being started sends a startup acknowledgement to the execution section 112 (step Sa151). Then, the execution section 112 sends startup information of the web browser applet 140c to the management section 122. The management section 122 receives the startup information of the web browser applet 140c and records an ID of the web browser applet 140c into the started status storage section 123 (step Sa152).

Next, operations in a case in which the download applet B is started from the web browser applet 140c will be explained. This scenario occurs in the following case, for example. The web browser applet 140c connects to a server that is connected to the Internet via the wireless communication section 150, receives a web page from that server, and displays it on the display section 151. The user then checks the web page displayed on the display section 151, and downloads and executes a trial version game program that is related to a link on that web page.

Hereinafter, it is assumed that the game program corresponding to the download applet B has been stored on the download applet storage section 130 by the web browser applet 140c. First, the user inputs a startup instruction for the download applet B by operating the key operation section 152. A startup event occurs in response to the input startup instruction and is received by the event reception section 125 of the APMAN 120. The event reception section 125 sends the received startup event to the management section 122 (step Sa160). The management section 122 receives that startup event and reads an ID of the applet currently being executed from the started status storage section 123. Since the ID of the read applet is that of the web browser applet 140c that is managed by the APMAN 120, the management section 122 sends a temporal termination request to the execution section 112 of the OS 110 in order to put the web browser applet 140c to the temporarily terminated status (step Sa161).

The execution section 112 receives the temporal termination request and sends a termination instruction including temporal termination information to the web browser applet 140c so that the web browser applet 140c is terminated in the OS 110 while being in the halted status in the APMAN 120 (step Sa162). The web browser applet 140c receives the termination instruction including temporal termination information, and sends a termination acknowledgement to the execution section 112. It is deleted from the executing status storage section 113 by the execution section 112 (step Sa163). At this stage, the executing status storage section 113 is in the status shown in the area (i) of FIG. 10.

Upon receiving the termination acknowledgement from the web browser applet 140c, the execution section 112 sends restore information of the web browser applet 140c to the APMAN 120. The web browser applet 140c receives the restore information and records the restore information into the restore information storage section 124. Furthermore, it deletes an ID of the web browser applet 140c from the started status storage section 123 (step Sa164). At this stage, the restore information storage section 124 is in the status shown in the area (b) of FIG. 9, and the restore information of the web browser applet 140c has been stored.

Furthermore, the execution section 112 that receives the termination acknowledgement from the web browser applet 140c reads data of the download applet B from the download applet storage section 130 and records the data of the download applet B into the executing status storage section 113 in order to start the download applet B (step Sa135). At this stage, the executing status storage section 113 is in the status shown in the area (j) of FIG. 10. The started download applet B sends a startup acknowledgement to the execution section 112 (step Sa166). Once receiving the startup acknowledgement from the download applet B, the execution section 112 sends startup information of the dummy applet to the management section 122. The management section 122 receives the startup information of the download applet B and records an ID of the download applet B into the started status storage section 123 (step Sa167). In this manner, after the download applet B is started, an opening screen of the game is displayed on the display section 151 by the download applet B and music for the game is output from the audio processing section 153. The game is started by the user who operates the key operation section 152.

Next, operations to restore the applet corresponding to a particular ID stored in the applet information storage section 126 when the download applet B that is currently being executed is forcibly terminated by the termination confirmation applet 140d will be explained with reference to FIGS. 11 to 14. In this example it is assumed that the ID stored in the applet information storage section 126 is the ID of the web browse applet 140c.

Figure 11:
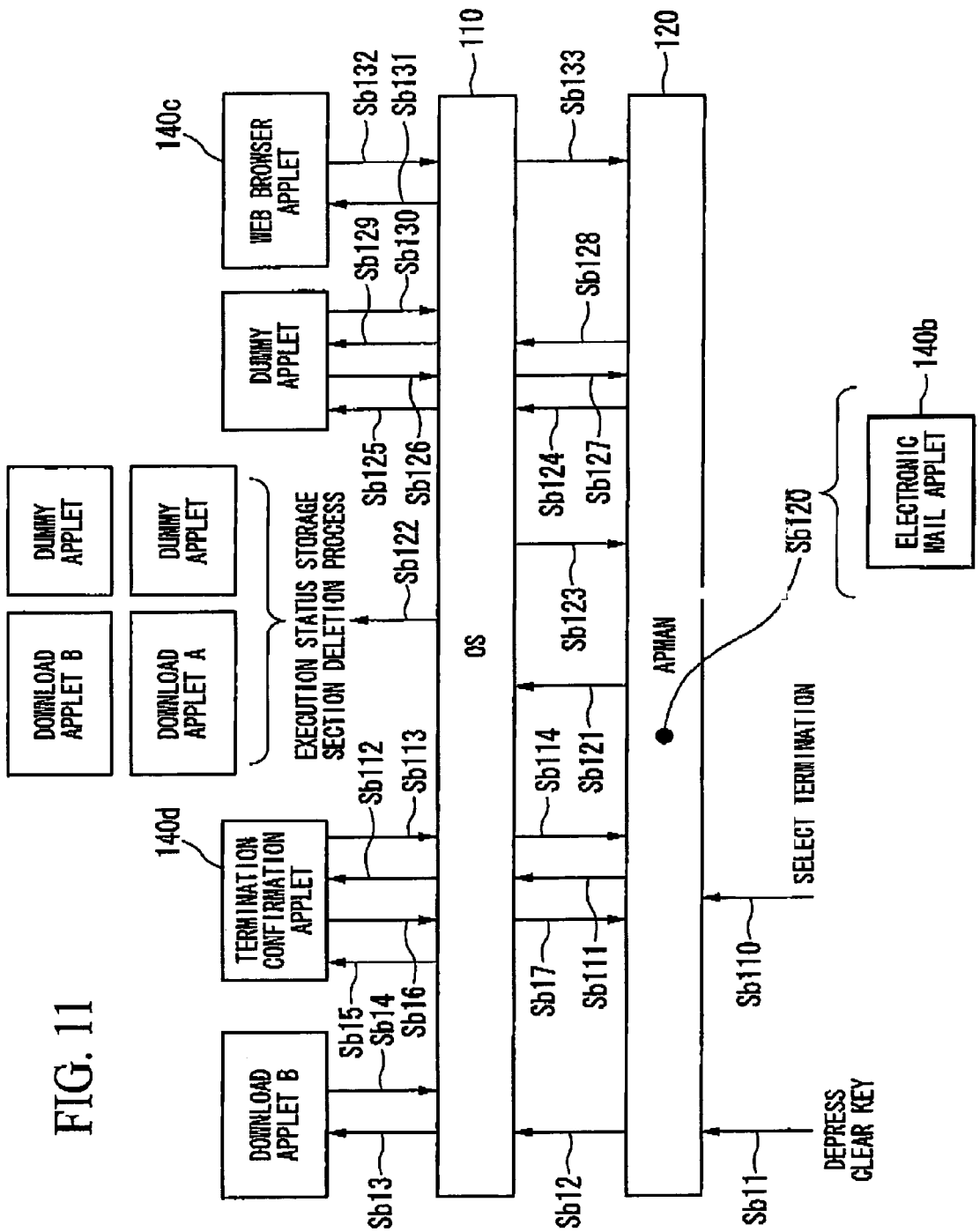
FIG. 11 is a sequence chart illustrating how forced termination of download applets is handled in the embodiment (part 1).
Figure 12:
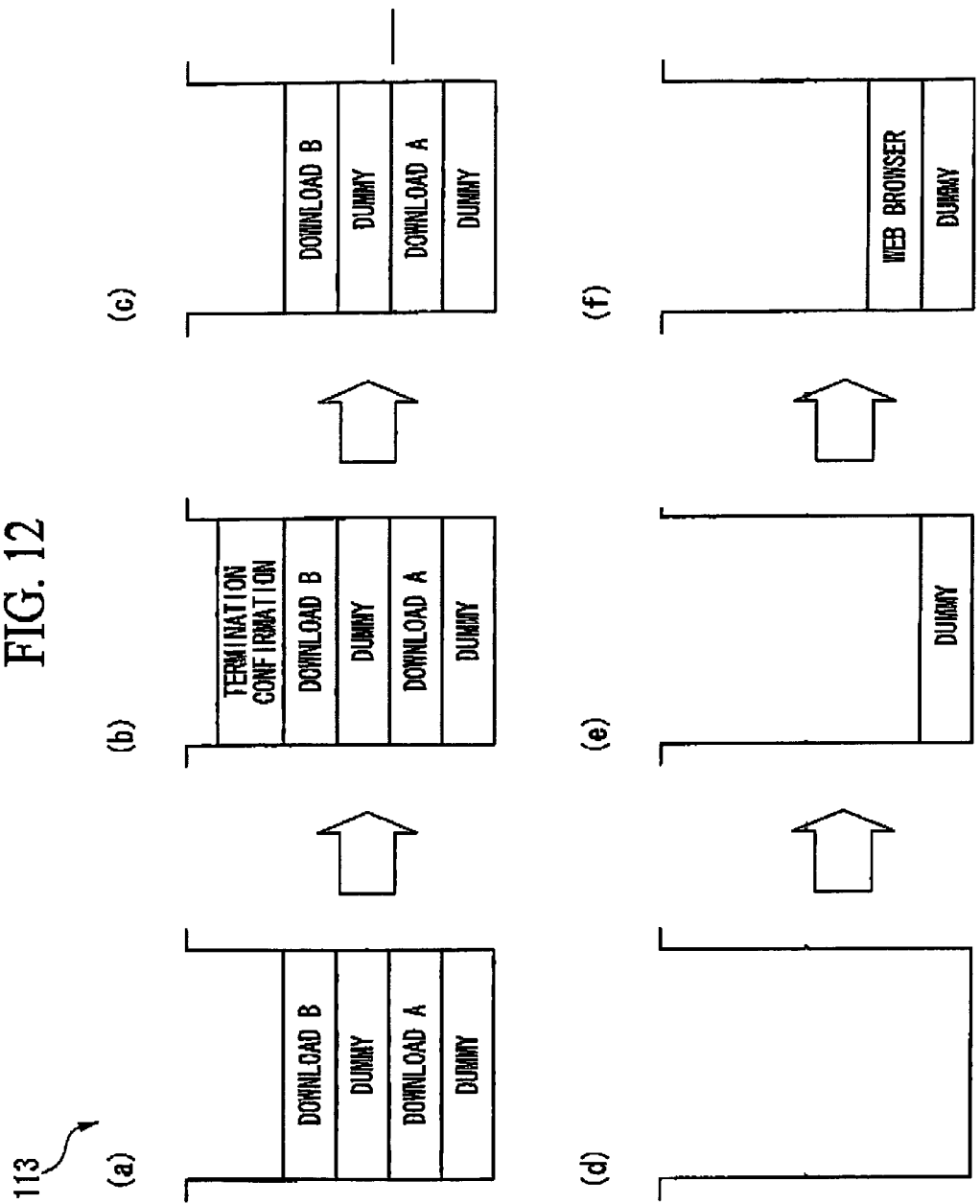
FIG. 12 is a diagram illustrating information stored in the executing status storage section for handing forced termination of download applets in the embodiment.
Figure 13:
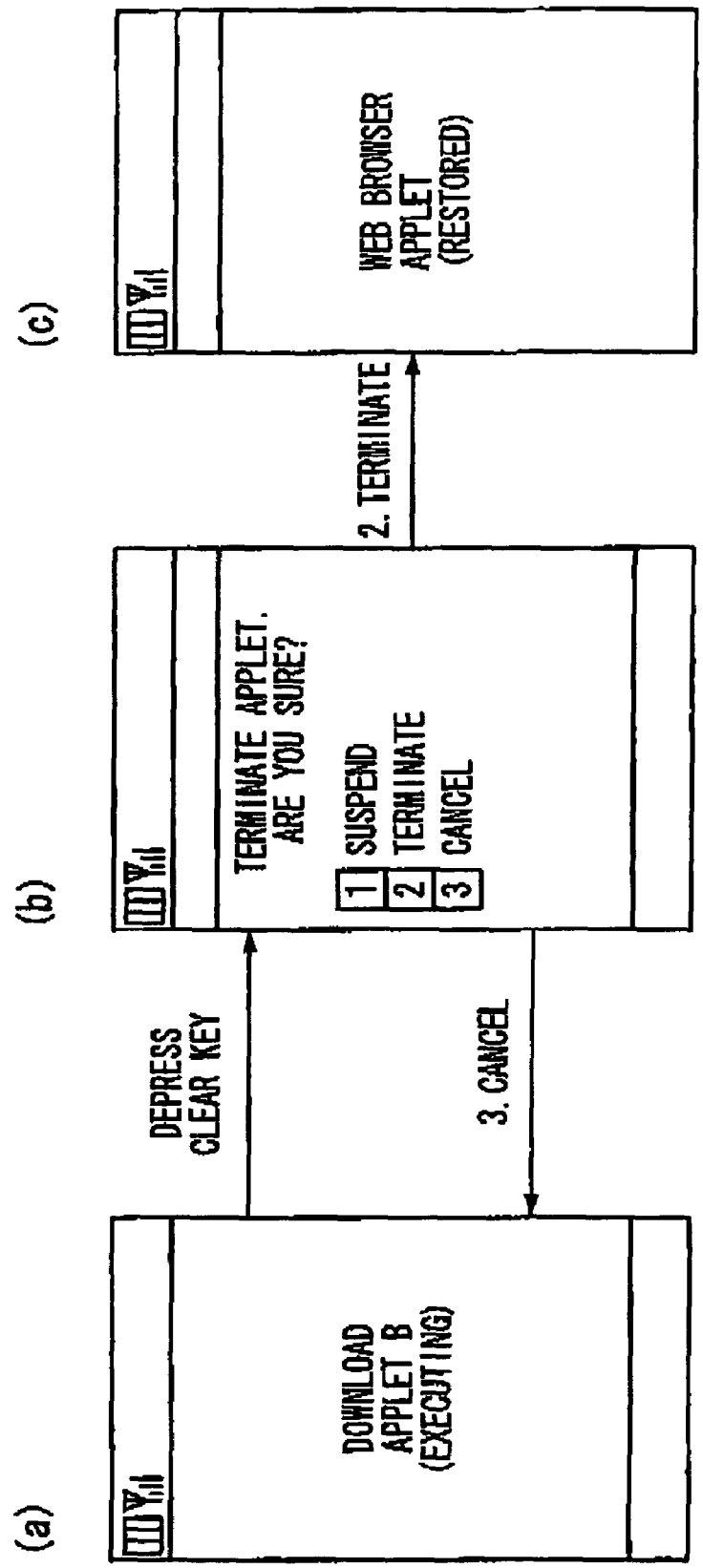
FIG. 13 is a diagram illustrating a screen displayed by a termination confirmation applet on a display section in the embodiment.
Figure 14:
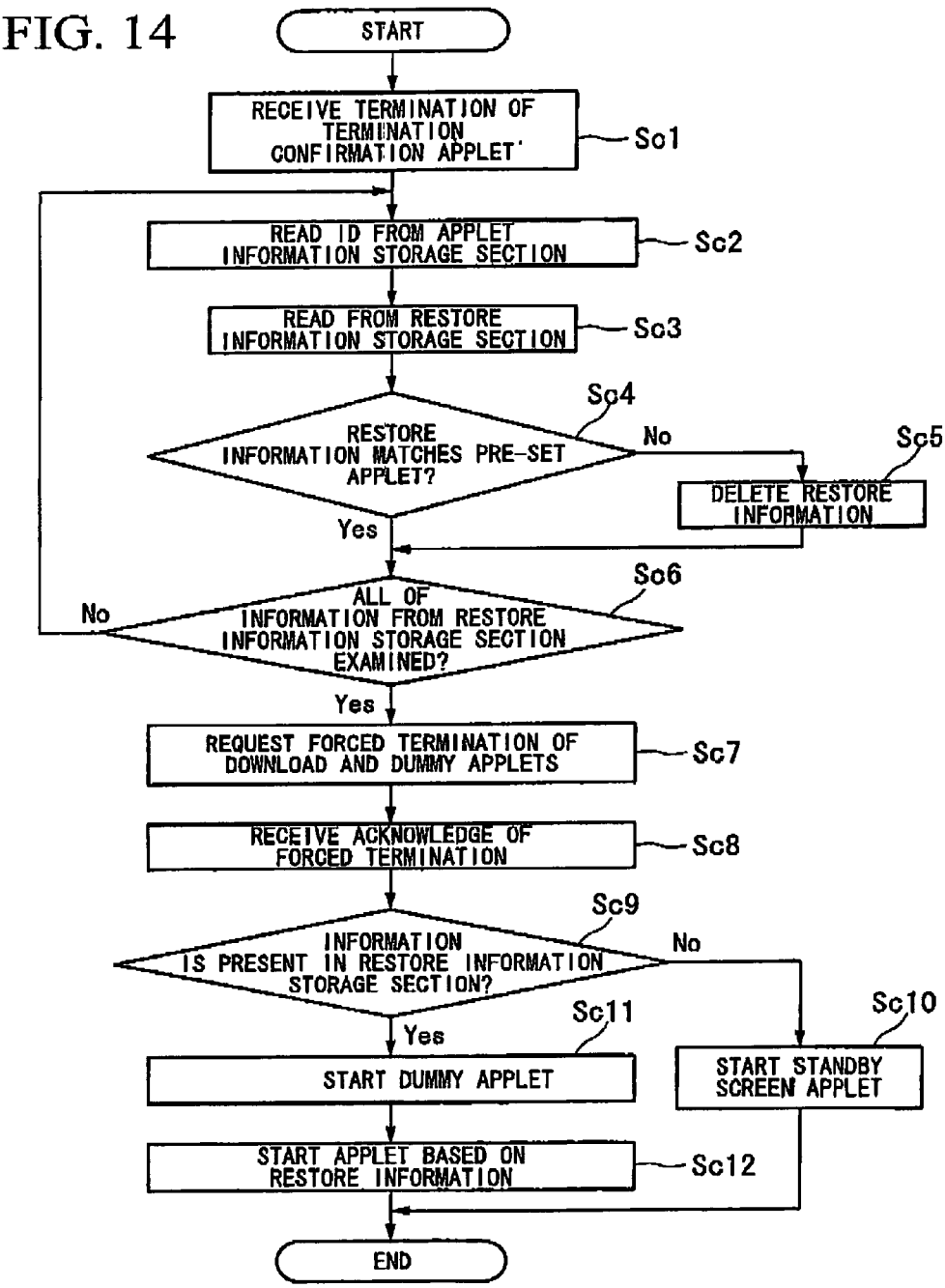
FIG. 14 is a flowchart of a restore information detection deletion process of the embodiment.

FIG. 11 is a sequence chart illustrating operations when the download applet B that is currently being executed is forcibly terminated by the termination confirmation applet 140d, and it is assumed that the operations shown in FIGS. 7 and 6 have been completed. Furthermore, FIG. 12 is a diagram illustrating how information stored in the executing status storage section 113 is modified in the operations shown in FIG. 11. FIG. 13 is a diagram illustrating a screen displayed on the display section 151 by the termination confirmation applet 140d in the operations shown in FIG. 11. Furthermore, FIG. 14 is a flowchart illustrating operations in the management section 122 when "TERMINATE" is selected on the termination confirmation applet 140d shown in FIG. 11.

First, the download applet B is executed and the screen shown in the area (a) of FIG. 13 is displayed on the display section 151 by the download applet B. The user operates a predetermined key (e.g., CLEAR key) of the key operation section 152 assigned for starting the termination confirmation applet 140d in order to forcibly terminate the download applet B that is currently being executed. A termination confirmation applet startup instruction is input in response to that operation and a termination confirmation applet startup instruction event is received by the event reception section 125. The event reception section 125 sends a termination confirmation applet startup instruction event to the management section 22 (step Sb11). The event reception section 125 receives the termination confirmation applet startup instruction event from the management section 122 and reads an ID of the applet currently being executed from the started status storage section 123. Since the ID of the read applet is that of the download applet B, the management section 122 sends a pause request for the download applet B to the execution section 112 of the OS 110 (step Sb12).

Once receiving that pause request, the execution section 112 sends a pause instruction to the download applet B that is currently being executed (step Sb13). The download applet B receives the pause instruction and is put in the paused status, and sends a pause acknowledgement to the execution section 112 (step Sb14).

At this stage, information of the download applet B is retained in the executing status storage section 113 and the status shown in the area (a) of FIG. 12 similar to the area (j) of FIG. 10 is maintained. The execution section 112 that receives the pause acknowledgement reads the termination confirmation applet 140d from the static applet storage section 140 and records the termination confirmation applet 140d into the executing status storage section 113 in order to start the termination confirmation applet 140d (step Sb15). At this stage, the executing status storage section 113 is in the status shown in the area (b) of FIG. 12. After being started, the termination confirmation applet 140d sends a startup acknowledgement to the execution section 112, as well as displaying the screen shown in the area (b) of FIG. 13 on the display section 151 (step Sb16). Then, the execution section 112 sends startup information of the termination confirmation applet 140d to the management section 122. The management section 122 receives the startup information of the termination confirmation applet 140d and records an ID of the termination confirmation applet 140d into the started status storage section 123 (step Sb17).

Next, in the screen shown in the area (b) of FIG. 13, when the user selects "2: TERMINATE" by operating the key operation section 152, a forced termination instruction is input. A forced termination event that occurs in response to the forced termination instruction is received by the event reception section 125 (step Sb110). The event reception section 125 sends the received forced termination event to the management section 122. Once receiving that forced termination event, the management section 122 firstly sends a termination request for the termination confirmation applet to the execution section 112 (step Sb111).

The execution section 112 that receives the termination request sends a termination instruction to the termination confirmation applet 140d in order to start the termination confirmation applet 140d (step Sb112). The termination confirmation applet 140d receives the termination instruction, and sends a termination acknowledgement to the execution section 112. It is deleted from the executing status storage section 113 by the execution section 112 (step Sb113). At this stage, the executing status storage section 113 is in the status shown in the area (c) of FIG. 12.

Upon receiving the termination acknowledgement, the execution section 112 sends information of the termination acknowledgement to the management section 122. Once the management section 122 receives the information of the termination acknowledgement, it deletes an ID of the termination confirmation applet 140d from the started status storage section 123 (step Sb114).

The management section 122 that receives the termination acknowledgement then reads an ID of a static applet from the applet information storage section 126. Since the ID of the web browser applet 140c is stored in the applet information storage section 126 in this example, the ID of the web browser applet 140c is read. Then, restore information of other static applets than the web browser applet 140c are deleted while a search is performed in the restore information storage section 124 based on the read ID of the web browser applet 140c. Since the restore information storage section 124 is in the status shown in the area (b) of FIG. 9, the web browser applet 140c is found and the ID and the restore information of the electronic mail applet 140d are deleted. It should be noted that the details of the operations for finding restore information of static applets having IDs that match the ID stored in the applet information storage section 126 and deleting restore information of static applets having IDs that do not match the ID stored in the applet information storage section 126 will be explained with reference to the restore information detection deletion process shown in FIG. 14 (step Sb120).

The management section 122 then sends a forced termination request to the execution section 112 in order to delete the download applet A, the download applet B, and the two dummy applets that are stored in the executing status storage section 113 and are in the paused status (step Sb121). Once receiving the forced termination request, the execution section 112 deletes the download applet A, the download applet B, and the two dummy applets from the executing status storage section 113 (step Sb122). At this stage, the executing status storage section 113 has the storage structure shown in the area (d) of FIG. 12. Once completing the deletion from the executing status storage section 113, the execution section 112 sends a forced termination acknowledgement to the management section 122. The management section 122 that receives the forced termination acknowledgement deletes the ID stored in the started status storage section 123 (step Sb123).

Once deleting the ID of the started status storage section 123, the management section 122 starts a dummy applet so that the standby screen applet 140a can be restored before reading restore information for the web browser applet 140c stored in the restore information storage section 124 for restoring the web browser applet 140c. This dummy applet is executed for the above-described reason (2).

The management section 122 sends a dummy applet startup instruction to the execution section 112 in order to start a dummy applet (step Sb124). The execution section 112 that receives the dummy applet startup instruction records the data of the dummy applet into the executing status storage section 113 in order to start the dummy applet (step Sb125). At this stage, the executing status storage section 113 is in the status shown in the area (e) of FIG. 12.

The started dummy applet sends a startup acknowledgement to the execution section 112 (step Sb126). Once receiving the startup acknowledgement from the dummy applet, the execution section 112 sends startup information of the dummy applet to the management section 122. The management section 122 receives the startup information of the dummy applet and records an ID of the dummy applet into the started status storage section 123 (step Sb127). Next, the management section 122 that receives the startup information of the dummy applet reads restore information of the web browser applet 140c from the restore information storage section 124 and sends a restore request for the web browser applet 140c including the restore information that has been read into the execution section 112 in order to start the web browser applet 140c of which the restore information is stored in the management section 122 (step Sb128). Once receiving the restore request including the restore information, the execution section 112 sends a pause instruction to the dummy applet in order to put the dummy applet in the paused status (step Sb129).

The dummy applet receives the pause instruction and is put in the paused status, and sends a pause acknowledgement to the execution section 112. The data of the dummy applet is not deleted from the executing status storage section 113 in response to the pausing, and the stored status is retained (step Sb130). The execution section 112 that receives the pause acknowledgement reads the web browser applet 140c from the static applet storage section 140 and records the web browser applet 140c into the executing status storage section 113 together with data of the restore information in order to start the web browser applet 140c based on the restore information (step Sa150). At this stage, the executing status storage section 113 is in the status shown in the area (f) of FIG. 13. The web browser applet 140c after being restored sends a restore acknowledgement to the execution section 112 (step Sb132). Upon receiving the restore acknowledgement from the web browser applet 140c, the execution section 112 sends restore information of the web browser applet 140c to the management section 122. The management section 122 that receives the restore information of the web browser applet 140c records the ID of the web browser applet 140c into the started status storage section 123 and deletes the ID and the restore information of the web browser applet 140b from the restore information storage section 124 (step Sb133).

It should be noted that although the termination confirmation applet 140c is a static applet, the termination confirmation applet 140d, once started, displays a screen prompting the user to confirm termination. Unless the user inputs an instruction from this screen by operating the key operation section 152, the operation is never switched to another applet; otherwise, it terminates by itself when an instruction is input by the user. As a result, no dummy applet is started before the startup of the termination confirmation applet 140d.

Next, the restore information detection deletion process in the management section 122 will be explained with reference to FIG. 14.

First, the termination acknowledgement of the termination confirmation applet 140d is received (step Sc1 which corresponds to step Sb114 shown in FIG. 11). The management section 122 that receives the termination acknowledgement reads an ID of an applet from the applet information storage section 126 (step Sc2 which corresponds to step Sb120 shown in FIG. 11). The management section 122 reads data on the restore information storage section 124 sequentially from the top of the stack (step Sc3 which corresponds to step Sb120 shown in FIG. 11). Then, the ID of the static applet read from the restore information storage section 124 and an ID read from the applet information store section 126 are compare to determine whether or not they match (step Sd4 which corresponds to step Sb120 shown in FIG. 11).

When the ID of the static applet read from the restore information storage section 124 and the ID read from the applet information storage section 126 do not match, the read ID restore information corresponding to that ID are deleted from the restore information storage section 124 and the flow proceeds to the next process (step Sc5 which corresponds to step Sb120 shown FIG. 11). On the other hand, when the ID of the static applet read from the restore information storage section 124 and the ID read from the applet information storage section 126 match, it is determined whether or not all of the entries stored in the restore information storage section 124 have been examined. Here, this determination may be made by, for example, saving the total number of entries stored in the restore information storage section 124 and decrements this number by one at every determination (step Sc6). When the examination is not completed, the flow goes back to step Sc3. When the examination is completed, the management section 122 sends a forced termination request to the execution section 112 since all of the download applets and dummy applets from the executing status storage section 123 have been deleted (step Sb17 which corresponds to step Sb121 shown in FIG. 11).

Next, the management section 122 receives a forced termination acknowledgement corresponding to the forced termination request from the execution section 112 (step Sc8 which corresponds to step Sb123 shown in FIG. 11). Once receiving the forced termination acknowledgement, the management section 122 determines whether or not there is any restore information in the restore information storage section 124 (step Sc9 which corresponds to step Sb124 shown in FIG. 11). When it is determined that there is no restore information in the restore information storage section 124, a startup request for the standby screen applet is sent to the execution section 112 (step Sc10).

On the other hand, when there is no restore information in the restore information storage section 124, the startup request for the standby screen applet is sent to the execution section 112 (step Sc11 which corresponds to step Sb124 shown in FIG. 11). The management section 122 then receives the startup information of the dummy applet from the execution section 112, and sends a startup request for the static applet to the execution section 112 based on the restore information stored in the restore information storage section 124 (step Sc23 which corresponds to step Sb128 shown in FIG. 11).

According to the configuration of the first aspect of the present invention, it is possible to restore only static applets set in the applet information storage section 126 after a download applet is forcibly terminated. Accordingly, it is possible to restore a web browser when a download applet of a trial version game that has been started from the web browser is forcibly terminated.

It should be noted that in the first status in FIG. 11, when a game program is normally terminated by an operation of the key operation section 152 made by the user, the web browser applet 140c is restored and the web page that has been displayed before the game was executed is displayed on the display section 151.

Furthermore, in the area (b) of FIG. 13, when "3: CANCEL" is selected by the operation by the user, the screen goes back to in the area (a) of FIG. 13 and the execution of the download applet B is continued.

The above-described portable telephone terminal 11 has a computer system therewithin. The process steps described above for starting, pausing, and terminating applets, temporarily terminating static applets, forcibly terminating download applets, and deleting restore information are stored in a computer readable medium as at least one program. The computer reads the program, and executes the processes of these steps. The computer readable medium includes, but is not limited to, magnetic disks, magneto-optical disks, CD-ROMs, DVD-ROMs, and semiconductor memories. Alternatively, the computer program way be delivered to computers via a communication line, and a computer which has received the delivered program may execute the program.

Second Aspect

In the following, a portable telephone terminal according to an embodiment of a second aspect of the present invention will be explained with reference to the drawings.

Figure 15:
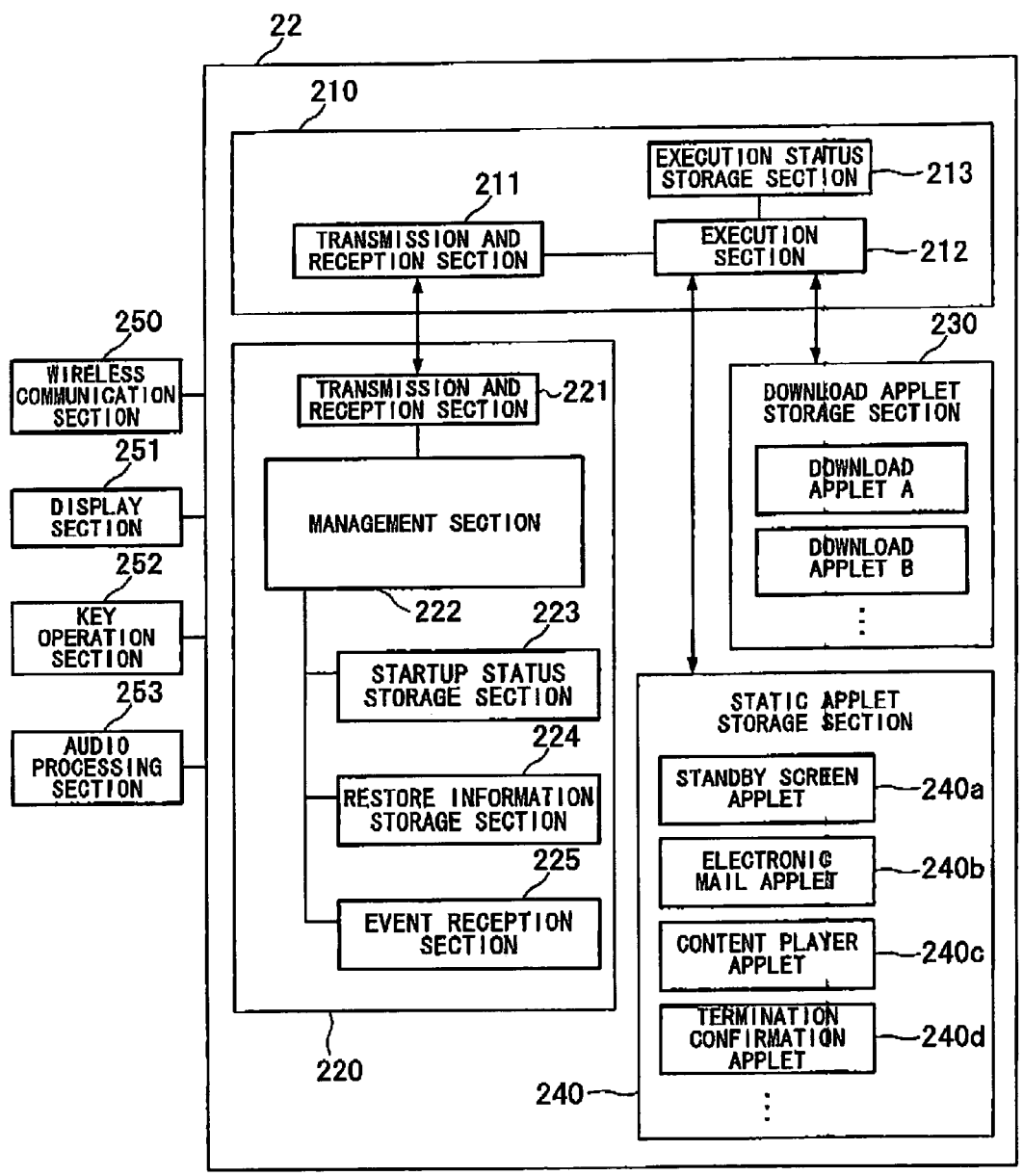
FIG. 15 is a block diagram illustrating an internal structure of a portable telephone according to an embodiment according to a second aspect of the present invention.

FIG. 15 is a schematic block diagram illustrating a portable telephone terminal 21 according to this embodiment.

In FIG. 15, a portable telephone terminal 21 includes, as basic functions of a portable telephone, a wireless communication section 250 that connects to a public communication network via a wireless communication and a key operation section 252 that receives inputs from a user. Furthermore, the portable telephone terminal 21 includes a display section 251 that outputs content data of a moving image downloaded from the Internet via the wireless communication section 250 and an audio processing section 253 that inputs and outputs the voice of the user upon placing or receiving a call and outputs data of a call incoming melody upon receiving an incoming call or content data of an audio. The portable telephone terminal 21 also includes a control section 22 that controls startup, pausing, and termination of applets.

The control section 22 includes an operating system 210 (hereinafter, referred to as an "OS") that executes a program software, i.e., an applet, an application manager 220 (hereinafter, referred to as "APMAN") that controls startup of an applet by determining the conflict status of the applet and the like, a static applet storage section 240 that stores static applets installed by default in the portable telephone terminal, and a download applet storage section 230 that stores download applets not installed by default in the portable telephone terminal.

In the control section 22, the static applet storage section 240 stores static applets that have been installed in the terminal by default by the developer of the portable telephone terminal 21. Such static applets may include, for example, a standby screen applet 240a that displays a standby screen on the display section 251, an electronic mail applet 240b that sends and receives electronic mails via the wireless communication section 250, and a content player applet 240c that outputs contents data of downloaded moving images or audios on the display section 251 or to the audio processing section 253 for replaying them Furthermore, other static applets may include a termination confirmation applet 240d that displays a screen asking for confirmation by the user, and suspends or forcibly terminates the applet being executed according to an operation made by the user using the key operation section 252.

The download applet storage section 230 stores applets of game programs that are downloaded from the Internet via the public communication network using the wireless communication section 250 in response to an operation made by the user using the key operation section 252 or download applets, such as games, that are read to the portable telephone terminal from a detachable recording medium by a predetermined operation.

The OS 210 controls execution, pausing, and termination of the static applets and the download applets. In the OS 210, a transmission and reception section 211 is connected to the APMAN 220, and sends and receives various pieces of information to and from the APMAN 220, such requests asking for startup of an applet or an acknowledgement from an applet that has been started. An executing status storage section 213 stores data of applets executed or paused by the execution section 212. The execution section 212 reads a static applet from the static applet storage section 240 or a download applet from the download applet storage section 230 in response to a request received from the APMAN 220 via the transmission and reception section 211, records data of the applet that has been read into the executing status storage section 213, and executes it.

The APMAN 220 starts, halts, or terminates static applets installed by default, or determines if there is a conflict between static applets. In the APMAN 220, a transmission and reception section 221 is connected to the transmission and reception section 211 of the OS 210, and sends and receives various pieces of information to and from the transmission and reception section 211, such as requests asking for startup of an applet or an acknowledgement from an applet that has been started. When a static applet is going to be started, a management section 222 determines a conflict status of the static applet, and sends a startup request for the static applet to the execution section 212 of the OS 210 via the transmission and reception section 221 if it is determined that the static applet can be started. Furthermore, the management section 222 receives an input made by the user using the key operation section 252, and sends a startup request of the download applet to the execution section 212 of the OS 210 when the download applet is going to be started.

A started status storage section 223 stores information related to an applet that is exert or paused by the execution section 212 of the OS 210. If there is any static applet that is terminated in the OS 210 but halted in the APMAN 220 by the management section 222 for the purpose of realizing a multitask-like operation on the static applet, a restore information storage section 224 stores information for restoring that static applet.

An event reception section 225 receives events that occur in response to an instruction input based on an operation made by the user using the key operation section 252 in order to start or stop an applet or events sent by an applet when that applet starts another applet.

It should be not that the above-described program execution section corresponds to the execution section 212 and the program management section corresponds to the management section 222. Furthermore, a download applet corresponds to the above-described unmanaged program, and a static applet corresponds to the above-described managed program. Furthermore, a termination confirmation program corresponds to the termination confirmation applet 240d.

Furthermore, in this embodiment, statuses related to a process of an applet are defined as follows. First, the status in which an applet is terminated in the OS 210 but halted in the APMAN 220 is defined as a "temporarily terminated" status.

The term "terminated" is defined as follows. When the term "normally terminated" is used, the applet is not forcibly terminated by the termination confirmation applet 240d, but is terminated by an internal operation of the applet. On the other hand, when the term "forcibly terminated" is used, it means that the applet is terminated by the termination confirmation applet 240d, that it is not terminated by the internal operation of the applet, and that it is forcibly deleted from the executing status storage section 213.

The term "suspend" refers to a "paused status" in which the status stored in the execution status storage section 213 is maintained for download applets, whereas the term refers to the above-described "temporarily terminated status" for static applets.

Figure 16:
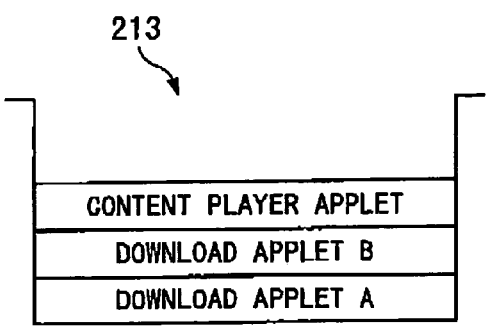
FIG. 16 is a diagram illustrating a data structure of an executing status storage section in the embodiment.

FIG. 16 is a diagram illustrating a data structure of the executing status storage section 213. The executing status storage section 213 is a stack-type storage area that is allocated in a heap area for storing data of an applet when the applet is being executed. Since the executing status storage section 213 is a stack-type storage area, the applet that was started the earliest is stored at the bottom of stack. When a new applet is started, the previously started applet is paused and the new applet is stacked on the paused applet. In other words, the applet data that is stored at the top is the applet that is currently being executed. Furthermore, when the top applet is terminated by the execution section 212, the data of the terminated applet on the top terminate is deleted. The second top applet data corresponding to the paused applet is released by the execution section 212, and the applet corresponding to that applet data is restarted.

Figure 17:
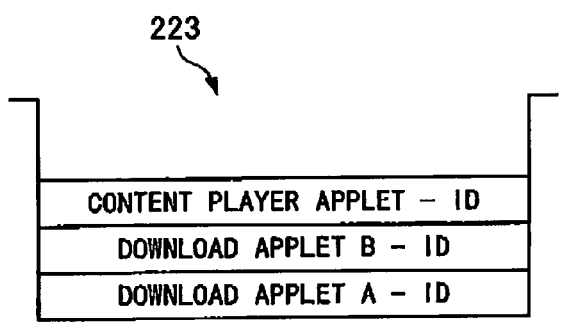
FIG. 17 is a diagram illustrating a data structure of a started status storage section in the embodiment.

FIG. 17 is a diagram illustrating a data structure of the started status storage section 223. The started status storage section 223 is also a stack-type storage area, and stores information relating to an applet being executed by the execution section 212, for example, it stores identification information (hereinafter, referred to as an "ID") given to each applet. In other words, IDs of applets corresponding to applet data stored in the executing status storage section 213 are stored in accordance with the order thereof in the executing status storage section 213. The management section 222 of the APMAN 220 can obtain information on an applet that is currently executed or paused in the executing status storage section 213 of the OS 210 by referring to the started status storage section 223

Figure 18:
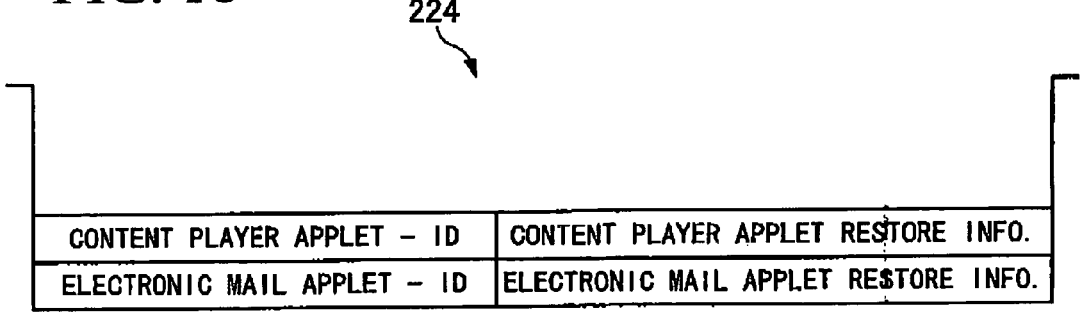
FIG. 18 is a diagram illustrating a data structure of a restore information storage section in the embodiment.

FIG. 18 is a diagram illustrating a data structure of the restore information storage section 224. The restore information storage section 224 is also a stack-type storage area. The APMAN 220 executes a control in which only one static applet is executed in the OS 210 at any time so that a plurality of static applets can be simultaneously started while saving the free memory space of the executing status storage section 213. In this case, restore information for restoring a static applet in the above-described temporarily terminated status which is terminated in the OS 210 but halted in the APMAN 220 is related to an ID that has been given to the static applet and is recorded in the restore information storage section 224.

Next, an operation executed by the OS 210 and the APMAN 220 to start an applet will be explained will be explained with reference to FIGS. 19 to 22. The following scenario will be explained. After startup of the standby screen applet 140a when the portable telephone terminal 21 is turned on, the electronic mail applet 240b and a download applet A are started in this order in response to the user's operations of the key operation section 252. The content player applet 240c is started from the download applet A, and the content player applet 240c in turn starts a download applet B.

Figure 19:
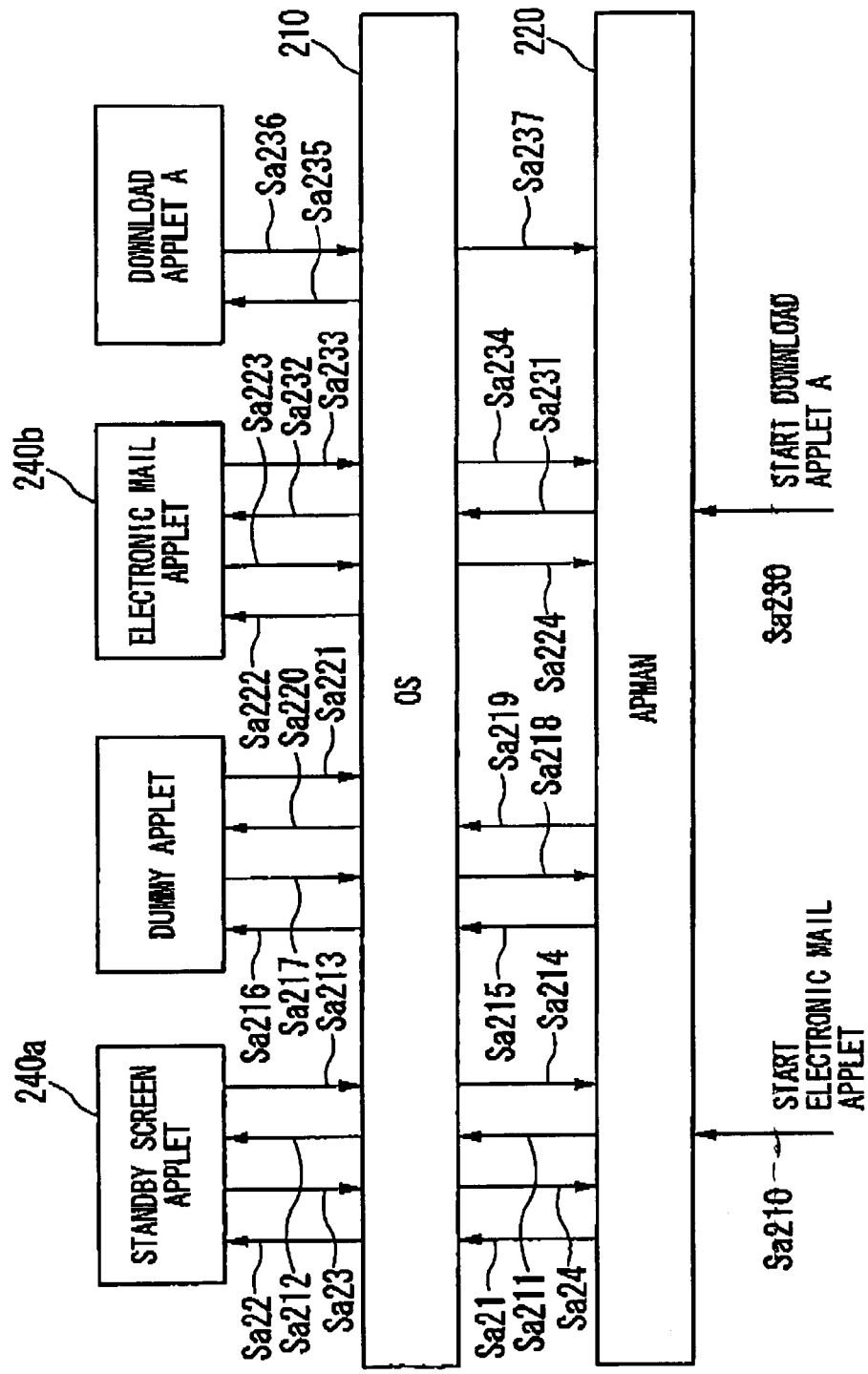
FIG. 19 is a sequence chart illustrating how start of applets is handled in the embodiment (part 1).
Figure 20:
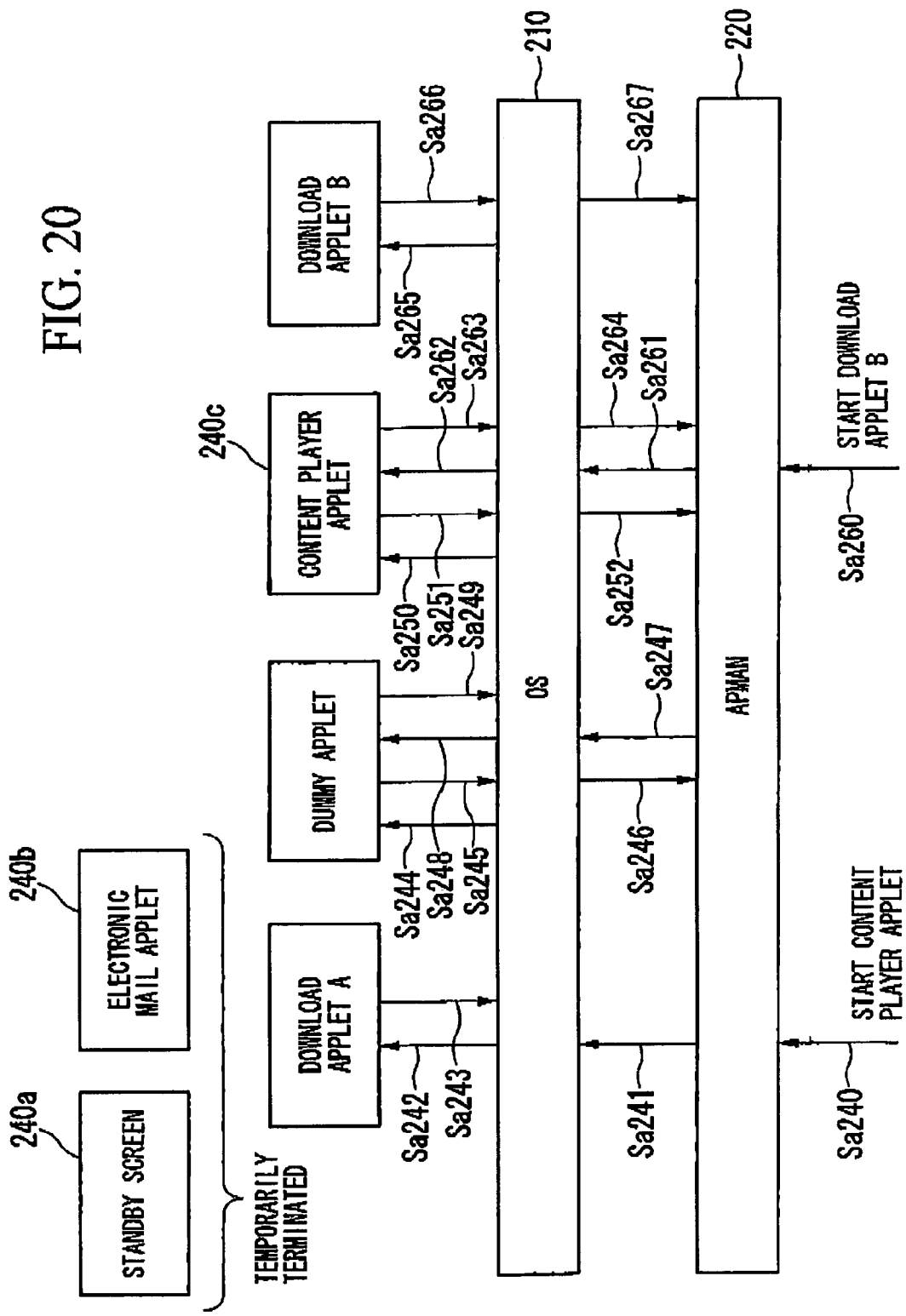
FIG. 20 is a sequence chart illustrating how start of applets is handled in the embodiment (part 2).
Figure 21:
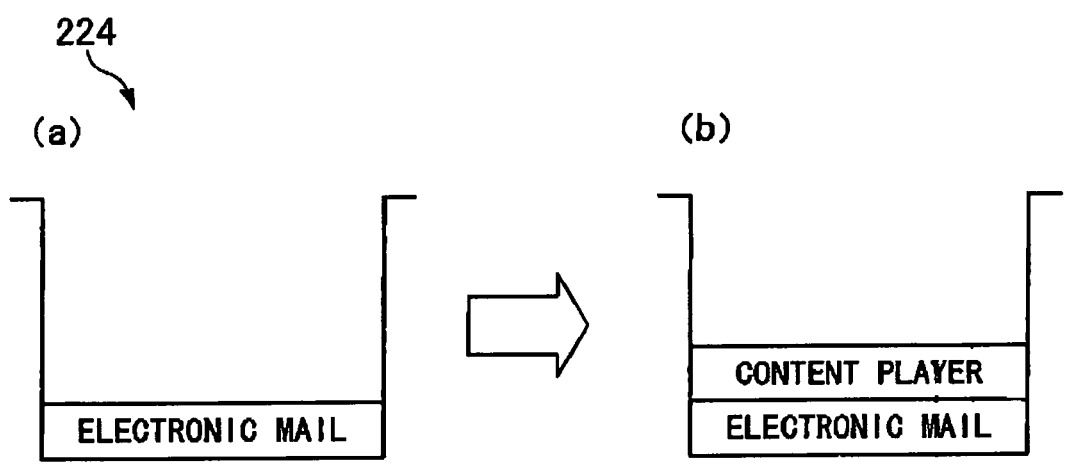
FIG. 21 is a diagram illustrating information stored in the restore information storage section for handling startup of applets in the embodiment.
Figure 22:
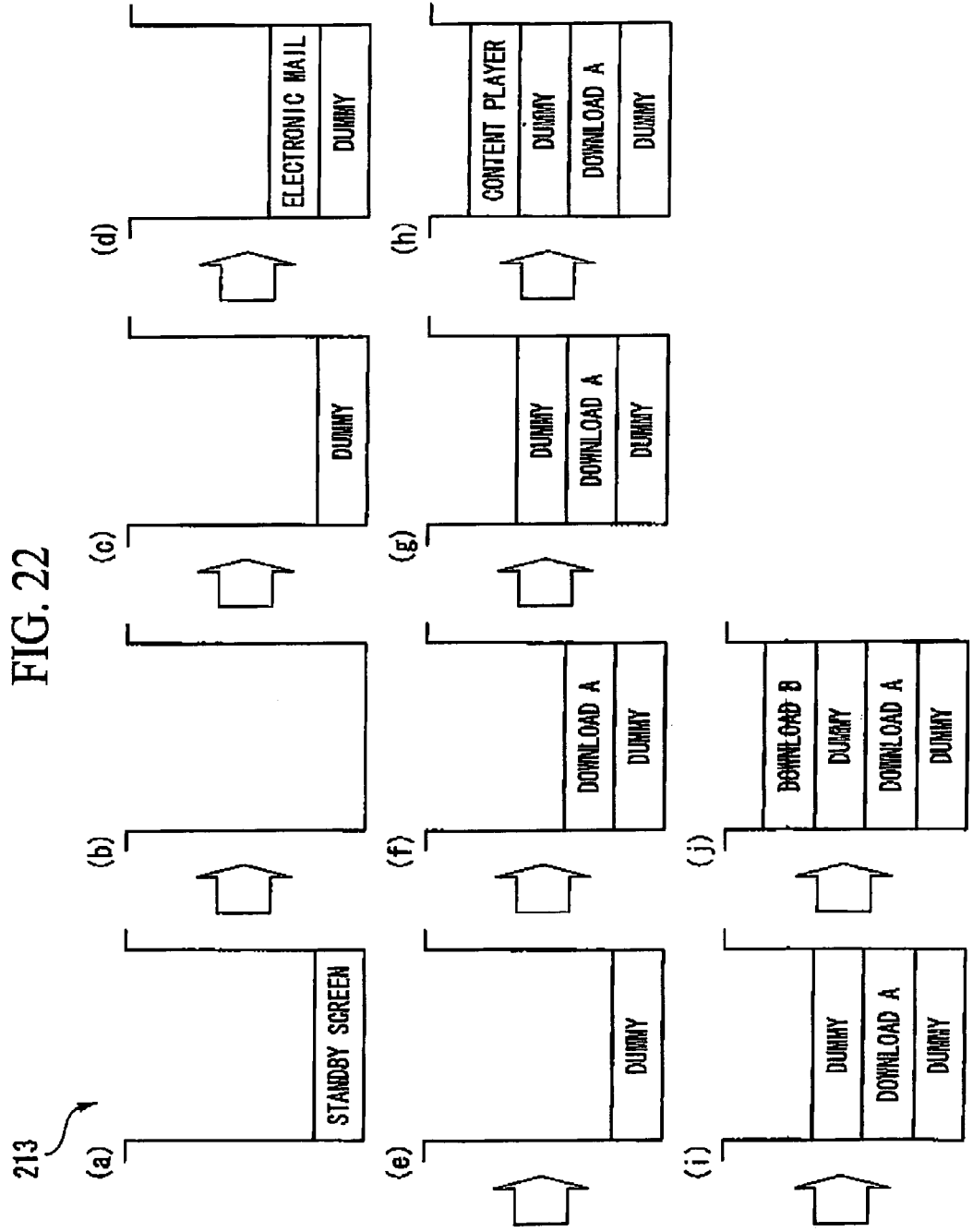
FIG. 22 is a diagram illustrating information stored in the executing status storage section for handling start of applets in the embodiment.

FIG. 19 is a sequence chart illustrating the operation in which the standby screen applet 240a, the electronic mail applet 240b, and the download applet A are started. Furthermore, FIG. 20 is a sequence chart illustrating the operation in which the content player applet 240c and the download applet B are started following the operation shown in FIG. 19. Furthermore, FIG. 21 is a diagram illustrating how information stored in the restore information storage section 224 is modified in the operations shown in FIGS. 19 and 20. Furthermore, FIG. 22 is a diagram illustrating how information stored in the executing status storage section 213 is modified in the operations shown in FIGS. 19 and 20.

First, when the portable telephone terminal 21 is turned on in response to an operation made by the user using the key operation section 252, the APMAN 220 is started and the management section 222 of the APMAN 220 then autonomously sends a standby screen applet startup request to the execution section 212 of the OS 210 (step Sa21). Once receiving to standby screen applet startup request, the execution section 212 reads the standby screen applet 240a from the static applet storage section 240, records it into the executing status storage section 213, and executes the standby screen applet 240a (step Sa22). At this stage, the executing status storage section 213 is in the status shown in the area (a) of FIG. 22. Once started, the standby screen applet 240a sends a startup acknowledgement to the execution section 212 (step Sa23). The execution section 212 sends startup information of the standby screen applet 240a to the management section 222. Once receiving the startup information of the standby screen applet 240a, the management section 222 records an ID of the standby screen applet 240a into the started status storage section 223 (step Sa24).

Next, in order to start the electronic mail applet 240b, the user inputs a startup instruction for the electronic mail applet 240b by operating the key operation section 252. A startup event occurs in response to the input startup instruction and is received by the event reception section 225 of the APMAN 220. The event reception section 225 sends the received event to the management section 222 (step Sa210). The management section 222 receives that startup event from event reception section 225 and reads an ID of the applet currently being executed from the started status storage section 223. Since the ID of the read applet is that of the standby screen applet 240a that is managed by the APMAN 220, the management section 222 sends a temporal termination request to the execution section 212 of the OS 210 in order to put the standby screen applet 240a in the temporarily terminated status (step Sa211).

The execution section 212 receives the temporal termination request and sends a termination instruction including temporal termination information to the standby screen applet 240a so that the standby screen applet 240a is terminated in the OS 210 while being in the halted status in the APMAN 220 (step Sa212). The standby screen applet 240a receives the termination instruction including the temporal termination information, and a termination acknowledgement to the execution section 212. It is deleted from the executing status storage section 213 by the execution section 212 (step Sa213).

At this stage, the executing status storage section 213 is in the status shown in the area (b) of FIG. 22.

It should be noted that since the standby screen applet 240a does not require restore information for being restored, no restore information is stored in the restore information storage section 224 upon a temporal termination. When the standby screen applet 240a is restored, it is started in the manner similar to the startup from an initial status.

Upon receiving the termination acknowledgement, to execution section 212 sends information of the termination acknowledgement to the management section 222. Once the management section 222 receives the information of the termination acknowledgement, it deletes an ID of the standby screen applet 240b from the started status storage section 223 (step Sa214). Next, the management section 222 receives the termination acknowledgement of the standby screen applet 240b and sends a dummy applet startup instruction to the execution section 212 in order to start a dummy applet (step Sa215).

As used herein, a dummy applet refers to an applet that displays nothing on the screen nor outputs any sounds. There are the following two reasons (1) and (2) to start the dummy applet.

(1) If there are a temporarily terminated static applet and a download applet that was started after the startup of that static applet and is currently paused, since that static applet is deleted from the executing status storage section 213, the download applet is restored earlier in the executing status storage section 213 when the applet that is currently being executed is terminated. Thus, by starting the dummy applet prior to the startup of the download applet, it becomes possible to maintain the restoring order because the dummy applet is started before the download applet and the static applet is restored in response to the restoration of the dummy applet.

(2) The standby screen applet 240a that is started upon the startup is to be restored by restarting it when the standby screen applet 240a is temporarily terminated by the APMAN 220 since there is no restore information to restore it from the temporarily terminated status. However, in that case, there is no restore information for restoration in the restore information storage section 224 and accordingly there is no cue to restart the standby screen applet 240a. Thus, restart of tee standby screen applet 240a is enabled by starting the dummy applet before temporarily terminating the standby screen applet 240a.

Next, the execution section 212 that receives the dummy applet startup instruction in FIG. 19 records the data of the dummy applet into the executing status storage section 213 in order to start the dummy applet (step Sa216). At this stage, the executing status storage section 213 is in the status shown in the area (c) of FIG. 22.

The started dummy applet sends a startup acknowledgement to the execution section 212 (step Sa217). Once receiving the startup acknowledgement from the dummy applet, the execution section 212 sends startup information of the dummy applet to the management section 222. The management section 222 receives the startup information of the dummy applet and records an ID of the dummy applet into the started status storage section 223 (step Sa218). Next, the management section 222 that receives the startup information of the dummy applet sends a startup request for the electronic mail applet 240b to the execution section 212 in order to start the electronic mail applet 240b (step Sa219). Once receiving the startup request, the execution section 212 sends a pause instruction to the dummy applet in order to put the dummy applet in the paused status (step Sa220).

The dummy applet receives the pause instruction and is put in the paused status, and sends a pause acknowledgement to the execution section 212. The data of the dummy applet is not deleted from the executing status storage section 213 in response to the pausing, and the stored status is retained (step Sa221). Next, the execution section 212 that receives the pause acknowledgement reads the electronic mail applet 240b from the static applet storage section 240 and records the electronic mail applet 240b into the executing status storage section 213 in order to start the electronic mail applet 240b (step Sa222). At this stage, the executing status storage section 213 is in the status shown in the area (d) of FIG. 22. The electronic mail applet 240b sends a startup acknowledgement to the execution section 212 (step Sa223). The execution section 212 that receives the startup acknowledgement of the electronic mail applet 240b sends startup information of the electronic mail applet 240b to the management section 222. The management section 222 receives the startup information of the electronic mail applet 240b and records an ID of the electronic mail applet 240b into the started status storage section 223 (step Sa224).

Next, in order to start the download applet A, the user inputs a start instruction for the download applet A by operating the key operation section 252. A startup event occurs in response to the input startup instruction and is received by the event reception section 225 of the APMAN 220. The event reception section 225 sends the received startup event to the management section 222 (step Sa230). The management section 222 receives that startup event and reads an ID of the applet currently being executed from the started status storage section 223. Since the ID of the read applet is that of the electronic mail applet 240b that is managed by the APMAN 220, the management section 222 sends a temporal termination request to the execution section 212 of the OS 210 in order to put the electronic mil applet 240b in the temporarily terminated status (step Sa231).

The execution section 212 receives the temporal termination request and sends a termination instruction including temporal termination information to the electronic mail applet 240b so that the electronic mail applet 240b is terminated in the OS 210 while being in the halted status in the APMAN 220 (step Sa232). The electronic mail applet 240b receives the termination instruction including the temporal termination information, and a termination acknowledgement to the execution section 212. It is deleted from the executing status storage section 213 by the execution section 212 (step Sa233). At this stage, the executing status storage section 213 is in the status shown in the area (e) of FIG. 22.

The execution section 212 that receives the termination acknowledgement from the electronic mail applet 240b sends restore information of the electronic mail applet 240b to the management section 222. The management section 222 receives the restore information and records the restore information into the restore information storage section 224. Furthermore, it deletes an ID of the electronic mail applet 240b from the started status storage section 223 (step Sa234). At this stage, the restore information storage section 224 is in the status shown in the area (a) of FIG. 21, and the restore information of the electronic mail applet 240b has been stored.

Furthermore, the execution section 212 that receives the termination acknowledgement from the electronic mail applet 240b reads data of the download applet A from the download applet storage section 230 and records the data of the download applet A into the executing status storage section 213 in order to start the download applet A (step Sa235).

At this stage, the executing status storage section 213 is in the status shown in the area (f) of FIG. 22. The started download applet A sends a startup acknowledgement to the execution section 212 (step Sa236). Once receiving the startup acknowledgement from the download applet A, the execution section 212 sends startup information of the dummy applet to the management section 222. The management section 222 receives the startup information of the download applet A and records an ID of the download applet A into the started status storage section 223 (step Sa237). Here, the download applet A is an applet that searches contents data such as music or moving images that have been stored in the internal storage area of the portable telephone terminal 21, for example, a search is carried out in response to an operation of the key operation section 252 made by the user and several file names of contents data are displayed on the display section 251.

FIG. 20 is a sequence chart illustrating operations in which the content player applet 240c is started from the download applet A and the download applet B is started, following the operations shown in FIG. 19. It should be noted that the standby screen applet 240a and the electronic mail applet 240b are in the temporarily terminated status in FIG. 20. Furthermore, it is assumed that the download applet B is an applet of a game.

Hereinafter, operations in which the above-described the content player applet 240c and the download applet B are started will be described with reference to FIG. 20. First, the download applet A that is started displays file names of contents data on the display section 251 as the search results. Once the user selects one of the contents data displayed on the display section 251 by operating the key operation section 252, a startup instruction for the content player applet 240c is input into APMAN 220. A startup event occurs in response to the input startup instruction and is received by the event reception section 225 of the APMAN 220. The event reception section 225 sends the received startup event to the management section 222 (step Sa240). The event reception section 225 receives that event from the management section 222 and reads an ID of the applet currently being executed from the started status storage section 223. Since the ID of the read applet is that of the download applet A that is not managed by the APMAN 220, the management section 222 sends a dummy applet startup instruction to the execution section 212 of the OS 210 in order to start to dummy applet. The dummy applet is started for the above-described reason (1) (step Sa241).

Once receiving the dummy applet startup instruction, the execution section 212 sends a pause instruction to the download applet A that is currently being executed (step Sa242). The download applet A receives the pause instruction and is put in the paused status, and sends a pause acknowledgement to the execution section 212. The data of the download applet A is not deleted from the executing status storage section 213 in response to the pausing, and the stored status is retained (step Sa243). The execution section 212 that receives the pause acknowledgement records the data of the dummy applet into the executing status storage section 213 in order to start the dummy applet (step Sa244). At this stage, the executing status storage section 213 is in the status shown in the area (g) of FIG. 22. The started dummy applet sends a startup acknowledgement to the execution section 212 (step Sa245). Once receiving the startup acknowledgement from the dummy applet, the execution section 212 sends startup information of the dummy applet to the management section 222. The management section 222 receives the startup information of the dummy applet and records an ID of the dummy applet into the started status storage section 223 (step Sa246).

Next, the management section 222 that receives the startup information of the dummy applet sends a up request for the content player applet 240c to the execution section 212 in order to start the content player applet 240c (step Sa247). Once receiving the startup request, the execution section 212 sends a pause instruction to the dummy applet in order to put the dummy applet in the paused status (step Sa248). The dummy applet receives the pause instruction and is put in the paused status, and sends a pause acknowledgement to the execution section 212. The data of the dummy applet is not deleted from the executing status storage section 213 in response to the pausing, and the stored status is retained (step Sa249). The execution section 212 that receives the pause acknowledgement reads the content player applet 240c from the static applet storage section 240 and records the content player applet 240c into the executing status storage section 213 together with data of the restore information in order to start the content player applet 240c (step Sa250). At this stage, the executing status storage section 213 is in the status shown in the area (h) of FIG. 22. The content player applet 240c after being started sends a startup acknowledgement to the execution section 212 (step Sa251). Then, the execution section 212 sends startup information of the content player applet 240c to the management section 222. The management section 222 receives the startup information of to content player applet 240c and records an ID of the content player applet 240c into the started status storage section 223 (step Sa252).

Next, the content player applet 240c reads contents data from the internal storage area and outputs the contents data of moving images and the contents data of audio that have been read to the display section 251 and the audio processing section 253, respectively. While the content player applet 240c is being output or the content data or the display has been completed, the user inputs a startup instruction for the game download applet B by operating the key operation section 252.

A startup event occurs in response to the input startup instruction and is received by the event reception section 225 of the APMAN 220. The event reception section 225 sends the received startup event to the management section 222 (step Sa260). The management section 222 receives that startup event and reads an ID of the applet currently being executed from the started status storage section 223. Since the ID of the read applet is that of the content player applet 240c that is managed by the APMAN 220, the management section 222 sends a temporal termination request to the execution section 212 of the OS 210 in order to put the content player applet 240c in the temporarily terminated status (step Sa261).

The execution section 212 receives the temporal termination request and sends a termination instruction including temporal termination information to the content player applet 240c so that the content player applet 240c is termination the OS 210 while being in the halted status in the APMAN 220 (step Sa262). The content player applet 240c receives the termination instruction including the temporal termination information, and a termination acknowledgement to the execution section 212. It is deleted from the executing status storage section 213 by the execution section 212 (step Sa263). At this stage, the executing status storage section 213 is in the status shown in the area (i) of FIG. 22.

Upon receiving the termination acknowledgement from the content player applet 240c, the execution section 212 sends restore information of the content player applet 240c to the APMAN 220. The content player applet 240c receives the restore information and records the restore information into the restore information storage section 224. Furthermore, it deletes an ID of the content player applet 240c from the started status storage section 223 (step Sa264). At this stage, the restore information storage section 224 is in the status shown in the area (b) of FIG. 21, and the restore information of the content player applet 240c has been stored in addition to the restore information of the electronic mail applet 240b.

Furthermore, the execution section 212 that receives the termination acknowledgement from the content player applet 240c reads data of the download applet B from the download applet storage section 230 and records the data of the download applet B into the executing status storage section 213 in order to start the download applet B (step Sa265). At this stage, the executing status storage section 213 is in the status shown in the area (j) of FIG. 22. The started download applet B sends a startup acknowledgement to the execution section 212 (step Sa266). Once receiving the startup acknowledgement from the download applet B, the execution section 212 sends startup information of the dummy applet to the management section 222. The management section 222 receives the startup information of the download applet B and records an ID of the download applet B into the started status storage section 223 (step Sa267). Then, an opening screen of the game is displayed on the display section 251 by the download applet B and music for the game is output from the audio processing section 253. The game is started by the user who operates the key operation section 252.

Next, operations to individually terminate only applets that are to be forcibly terminated by the termination confirmation applet 240d when the download applet B that is currently being executed is forcibly terminated by the termination confirmation applet 240d will be explained with reference to FIGS. 23 to 25.

Figure 23:
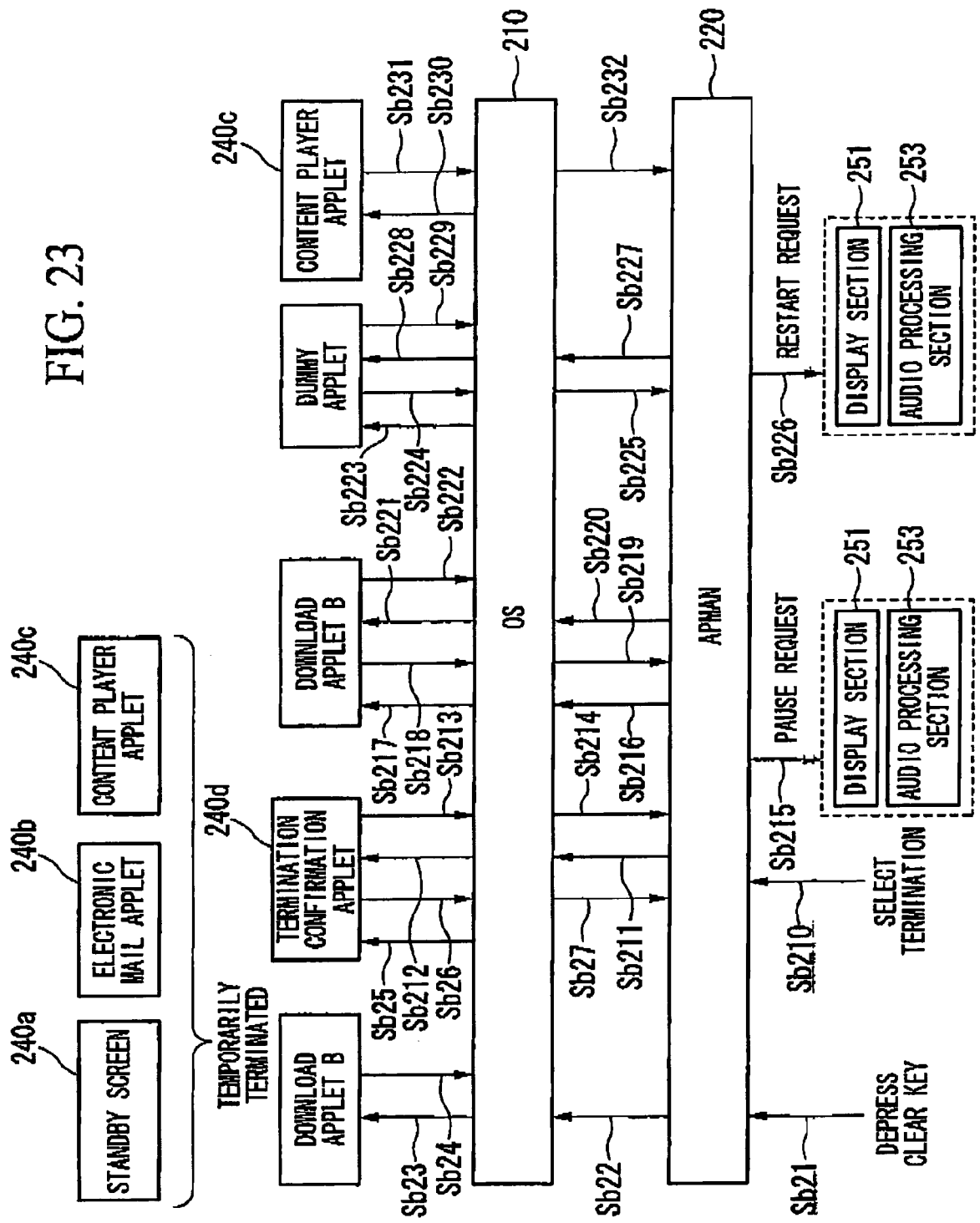
FIG. 23 is a sequence chart illustrating how termination of download applets is handled in the embodiment (part 1).

FIG. 23 is a sequence chart illustrating operations when the download applet B that is currently being executed is forcibly terminated by the termination confirmation applet 240d, and it is assumed that the operations shown in FIGS. 19 and 20 have been completed. Furthermore, FIG. 24 is a diagram illustrating how information stored in the executing status storage section 213 is modified in the operations shown in FIG. 23. FIG. 25 is a diagram illustrating a screen displayed on the display section 251 by the termination confirmation applet 240d in the operations shown in FIG. 23.

Figure 25:
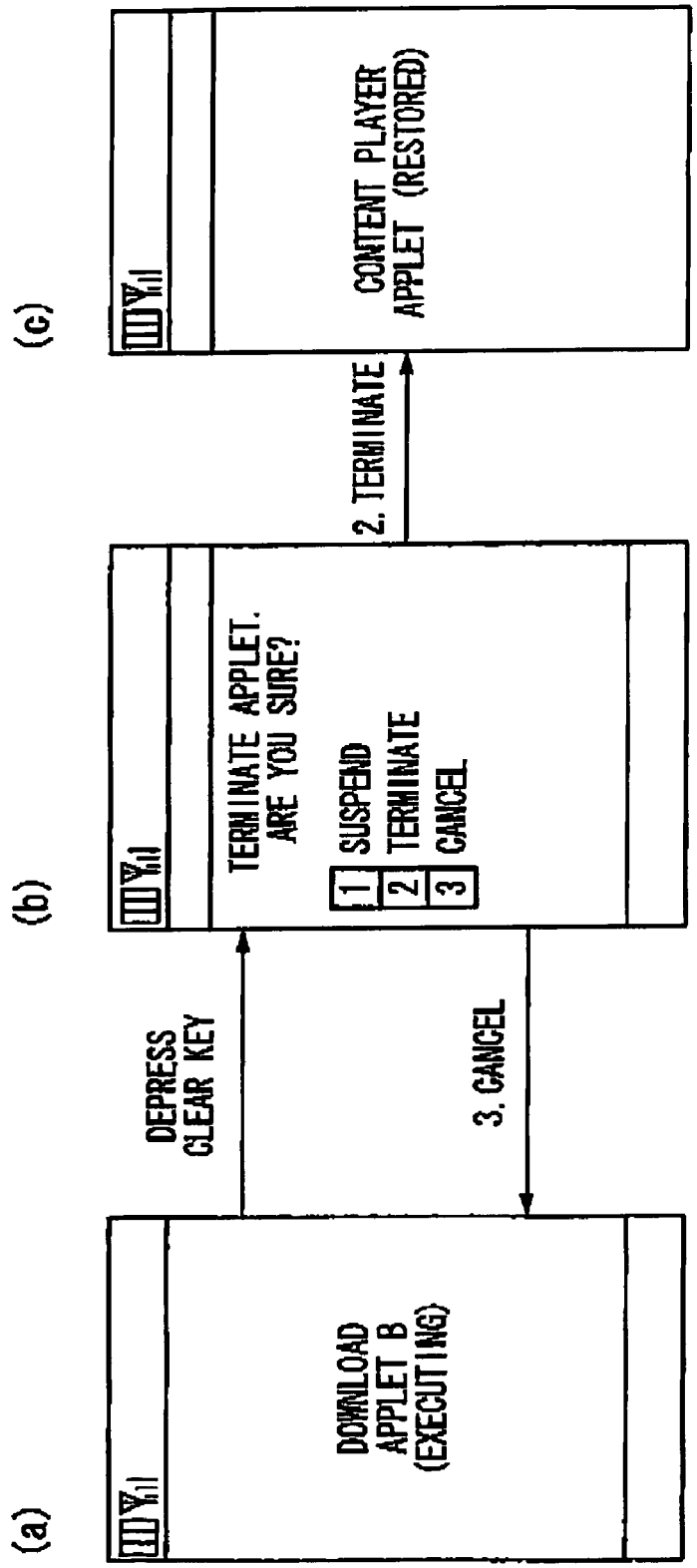
FIG. 25 is a diagram illustrating a screen displayed by a termination confirmation applet on a display section in the embodiment.

First, the download applet B is executed and the screen shown in the area (a) of FIG. 25 is displayed on the display section 251 by the download applet B. The user operates a predetermined key (e.g., CLEAR key) of the key operation section 252 assigned for starting the termination confirmation applet 240d in order to forcibly terminate the download applet B that is currently being executed. A termination confirmation applet startup instruction is input in response to that operation and a termination confirmation applet startup instruction event is received by the event reception section 225. The event reception section 225 sends a termination confirmation applet startup instruction event to the management section 222 (step Sb21). The event reception section 225 receives the termination confirmation applet startup instruction event from the management section 222 and reads an ID of the applet currently being executed from the started status storage section 223. Since the ID of the read applet is that of the download applet B, the management section 222 sends a pause request for the download applet B to the execution section 212 of the OS 210 (step Sb22).

Once receiving that pause request, the execution section 212 sends a pause instruction to the download applet B that is currently being executed (step Sb23). The download applet B receives the pause instruction and is put in the paused status, and sends a pause acknowledgement to the execution section 212 (step Sb24).

Figure 24:
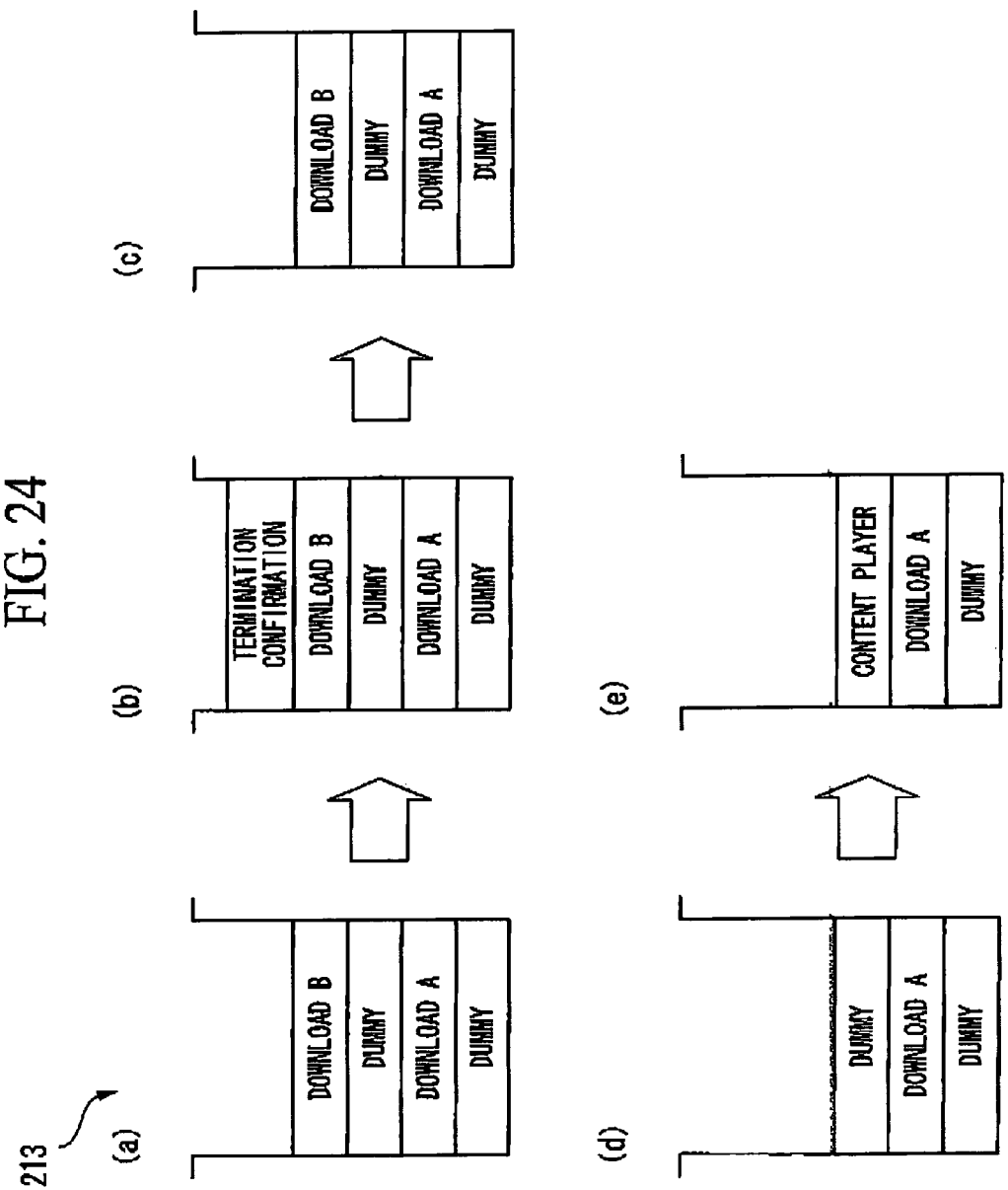
FIG. 24 is a diagram illustrating information stored in the executing status storage section for handling termination of download applets in the embodiment.

At this stage, information of the download applet B is retained in the executing status storage section 213 and the status shown in the area (a) of FIG. 24 similar to the area (j) of FIG. 22 is maintained. The execution section 212 that receives the pause acknowledgement reads the termination confirmation applet 240d from the static applet storage section 240, records the termination confirmation applet 240d into the executing status storage section 213 and start the termination confirmation applet 240d in order to start the termination confirmation applet 240d (step Sb25). At this stage, the executing status storage section 213 is in the status shown in the area (b) of FIG. 24. After being started, the termination confirmation applet 240d sends a startup acknowledgement to the execution section 212, as well as displaying the screen shown in the area (b) of FIG. 25 on the display section 251 (step Sb26). Then, the execution section 212 sends startup information of the termination confirmation applet 240d to the management section 222. The management section 222 receives the startup information of the termination confirmation applet 240d and records an ID of the termination confirmation applet 240d into the started status storage section 223 (step Sb27).

Next, in the screen shown in the area (b) of FIG. 25, when the user selects "2: TERMINATE" by operating the key operation section 252, a forced termination instruction is input. In this case, the applet to be forcibly terminated is the one that is stored right before the termination confirmation applet 240d in the started status storage section 223. In this example, the download applet B is the applet to be forcibly terminated.

A forced termination event that occurs in response to the forced termination instruction input by the termination confirmation applet 240d is received by the event reception section 225 (stop Sb210). The event reception section 225 sends the received forced termination event to the management section 222. Once receiving that forced termination event, the management section 222 firstly sends a termination request for the termination confirmation applet to the execution section 212 (step Sb211).

The execution section 212 that receives the termination request sends a termination instruction to the termination confirmation applet 240d in order to start the termination confirmation applet 240d (step Sb212). The termination confirmation applet 240d receives the termination instruction, and a termination acknowledgement to the execution section 212. It is deleted from the executing status storage section 213 by the execution section 212 (step Sb213). At this stage, the executing status storage section 213 is in the status shown in the area (c) of FIG. 24.

Upon receiving the termination acknowledgement, the execution section 212 sends information of the termination acknowledgement to the management section 222. Once the management section 222 receives the information of the termination acknowledgement, it deletes an ID of the termination confirmation applet 240d from the started status storage section 223 (step Sb214).

Here, since the management section 222 that receives the termination acknowledgement individually terminates only the download applet B, instead of carrying out forced termination in which all of the download applets are deleted is this embodiment, the termination of the download applet B is controlled to be a normal termination. In other words, the download applet B is controlled so that it is charged from the paused status to the executing status to normally terminate it.

In this case, when the download applet B is changed from the paused status to the executing status, it goes back to the state before it was paused. As a result, a screen of the game would be displayed on the display section 251 by the download applet B and the music of the game would be output from the audio processing section 253. This operation is annoying to the user since the user considers that the download applet B has been terminated by the termination confirmation applet 240d. The management section 222, therefore, sends a display pause request to the display section 251 and sends an audio sound pause request to the audio processing section 253 before normally terminating the download applet B in order to stop the operations of output sections, such as the display section 251, the audio processing section 253, or the like. The display section 251 and the audio processing section 253 receive the respective halt requests and halt their operations (step Sb215).

On the other hand, the management section 222 reads the ID of the download applet B that is stored on the top of the started status storage section 223 and sends a restore request including the read ID of the download applet B to the execution section 212 (step Sb216). Once receiving the restore request, the execution section 212 finds the download applet B in the paused status from the executing status storage section 213 based on the ID of the download applet B contained in the restore request, and changes the download applet B to the executing status (step Sb217).

The download applet B that is changed to the executing status sends a restore acknowledgement to the execution section 212. In this case, since the download applet B goes back to the state before it was paused, it attempts to output the screen or the audio of the game. However, because the operations of the display section 251 and the audio processing section 253 are halted, the screen or the audio are not displayed on the display section 251 or the audio processing section 253 by the download applet B (step Sb218). Once receiving the restore acknowledgement from the download applet B, the execution section 212 sends restore information contained in the restore acknowledgement to the management section 222 (step Sb219).

Once receiving restore information of the download applet B, the management section 222 then sends a termination request for the download applet B to the execution section 212 (step Sb220). The execution section 212 that receives the termination request for the download applet B from the management section 222 sends a termination instruction to the download applet B in order to terminate the download applet B (step Sb221). The download applet B receives a termination acknowledgement from the execution section 212 and deletes the information of the download applet B from the executing status storage section 213. At this stage, the executing status storage section 213 is in the status shown in the area (d) of FIG. 24 (step Sb222).

Next, the execution section 212 sends a startup instruction in order to change a dummy applet that is in the paused status and stored on the top of the executing status storage section 213 to the started status (step Sb223). The dummy applet receives the startup instruction and reply to the execution section 212 with a startup acknowledgement (step Sb224).

Once receiving the startup acknowledgement, the execution section 212 sends startup information of the dummy applet to the management section 222 (step Sb225).

The management section 222 that receives the startup information of the dummy applet sends a display restart request to the display section 251 and an audio sound restart request to the audio processing section 253 in order to restart the operations of the display section 251 and the audio processing section 253 (step Sb226). Additionally, the management section 222 reads restore information of the content player applet 240c that is stored on the top of the restore information storage section 224 shown in the area (b) of FIG. 21. The management section 222 sends a startup request for the content player applet 240c including the restore information of the content player applet 240c to the execution section 212 in order to restore the content player applet 240c (step Sb227). Once receiving the start request, the execution section 212 sends a pause instruction to the dummy applet that is currently being executed in order to put the dummy applet in the paused status (step Sb228). The dummy applet receives the pause instruction and is put in the paused status, and sends a pause acknowledgement to the execution section 212. The data of the dummy applet is not deleted from the executing status storage section 213 in response to the pausing, and the stored status is retained (step Sb229).

The execution section 212 that receives the pause acknowledgement reads the content player applet 240c from the static applet storage section 240 and records the content player applet 240c into the executing status storage section 213 so that the restore information is included in order to start the content player applet 240c (step Sb230). The content player applet 240c after being started sends a start acknowledgement to the execution section 212 (step Sb231). Then, the execution section 212 sends startup information of the content player applet 240c to the management section 222. The management section 222 receives the startup information of the content player applet 240c and records information of the content player applet 240c into the started status storage section 223 (step Sb232). At this stage, the executing status storage section 213 is in the status shown in the area (e) of FIG. 24, and the display section 251 is as shown in the area (c) of FIG. 25.

According to the above-described configuration of the second aspect of the present invention, when there is a download applet that is to be terminated by the termination confirmation applet 240d, it becomes possible to terminate only that download applet while maintaining information of other applets being suspended. This enables restoration of applications in the reverse order to the order of the startup and provision of user-friendly interfaces.

The above-described portable telephone terminal 21 has a computer system therewithin. The process steps described above for starting, pausing, and terminating download applets, and starting, temporarily terminating, and terminating static applets are stored in a computer readable medium as at least one program. The computer reads the program, and executes the processes of these steps. The computer readable medium includes, but is not limited to, magnetic disks, magneto-optical disks, CD-ROMs, DVD-ROMs, and semiconductor memories. Alternatively, the computer program may be delivered to computers via a communication line, and a computer which has received the delivered program may execute the program.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A portable terminal device that controls execution, pausing, and termination of programs, comprising:
   a processor executing a program execution section that controls execution, suspension, and termination of programs, wherein the termination of programs deletes the program from a memory;
   an output section that outputs information based on an instruction of the program;
   the processor executing a program management section that makes the program execution section suspend the first program when a second program is being executed, wherein
   when the program management section receives a termination request of the first program that is suspended based on execution of the second program from the second program, the program management section terminates the second program and executes the first program, and then terminates the first program,
   the program management section sends a pause request to the output section before the termination of the second program and execution of the first program, and
   the program execution section that makes an executing program become suspended, which is pausing if the executing program is an unmanaged program, or is terminating and storing restore information for restoration into a storage section if the executing program is a managed program,
   the program management section, when there is a third program that has been executed before the first program is executed and is being suspended, makes the program execution section restore the third program when the program management section makes the program execution section terminate the first program, and
   after the execution of the first program is finished, a dummy program is executed to cause the output section to output no information, in response to which the program management section executes the third program.

2. The portable terminal device according to claim 1, wherein the program management section sends a restart request to the output section after making the program execution section terminate the first program.

3. The portable terminal device according to claim 1, wherein the second program is a termination confirmation program in response to a detection of an operation of a predetermined key while the first program is being executed.

4. The portable terminal device according to claim 1, wherein the programs have at least unmanaged program and a managed program,
   wherein a program execution section that makes an executing program that is executed become suspended, which is pausing if the executing program is the unmanaged program, or is terminating and storing restore information for restoration by the program execution section if the executing program is the managed program; and
   wherein the first program is the managed program.

5. The portable terminal device according to claim 1, wherein the programs have at least unmanaged program and a managed program,
   wherein a program execution section that makes an executing program that is executed become suspended, which is pausing if the execution program is the unmanaged program, or is terminating and storing restore information for restoration by the program execution section if the executing program is the managed program;
   wherein the third program is the managed program; and
   wherein the program management section, stores restore information of the third program for restoration when the third program is terminated based on execution of the first program, and reads restore information of the third program to make the program execution section restore the third program when the program management section makes the program execution section terminate the first program.

* * * * *